US010683434B2

(12) United States Patent
Sandmeyer et al.

(10) Patent No.: US 10,683,434 B2
(45) Date of Patent: Jun. 16, 2020

(54) ORGANOCOPOLYMER DISPERSIONS

(71) Applicant: Wacker Chemie AG, Munich (DE)

(72) Inventors: Frank Sandmeyer, Burgkirchen (DE); Amanda Andrews, Petersburg, MI (US); James Greene, Adrian, MI (US)

(73) Assignee: WACKER CHEMIE AG, Munich (DE)

( * ) Notice: Subject to any disclaimer, the term of this patent is extended or adjusted under 35 U.S.C. 154(b) by 48 days.

(21) Appl. No.: 15/771,623

(22) PCT Filed: Nov. 23, 2016

(86) PCT No.: PCT/EP2016/078598
§ 371 (c)(1),
(2) Date: Apr. 27, 2018

(87) PCT Pub. No.: WO2017/089426
PCT Pub. Date: Jun. 1, 2017

(65) Prior Publication Data
US 2018/0305576 A1   Oct. 25, 2018

(30) Foreign Application Priority Data

Nov. 24, 2015   (DE) .................. 10 2015 223 246

(51) Int. Cl.
| C09D 151/08 | (2006.01) |
| C08F 2/22 | (2006.01) |
| C08F 283/12 | (2006.01) |
| C08F 290/06 | (2006.01) |
| B32B 21/08 | (2006.01) |
| C08F 20/18 | (2006.01) |
| C08F 116/04 | (2006.01) |
| C08F 212/08 | (2006.01) |
| C08F 236/06 | (2006.01) |

(52) U.S. Cl.
CPC .......... *C09D 151/085* (2013.01); *B32B 21/08* (2013.01); *C08F 2/22* (2013.01); *C08F 283/124* (2013.01); *C08F 290/068* (2013.01); *C08F 20/18* (2013.01); *C08F 116/04* (2013.01); *C08F 212/08* (2013.01); *C08F 236/06* (2013.01)

(58) Field of Classification Search
None
See application file for complete search history.

(56) References Cited

U.S. PATENT DOCUMENTS

| 5,618,879 | A | 4/1997 | Cavivenc et al. |
| 6,852,821 | B1 | 2/2005 | Bendix et al. |
| 7,674,868 | B2 | 3/2010 | Minge et al. |
| 8,614,278 | B2 * | 12/2013 | Loubert ............... A61K 9/7084 424/443 |
| 8,653,214 | B2 * | 2/2014 | Venzmer ............... C08F 283/12 526/279 |
| 9,611,388 | B2 * | 4/2017 | Watanabe ............... C08L 77/06 |
| 2003/0114583 | A1 | 6/2003 | Stark et al. |
| 2006/0052529 | A1 * | 3/2006 | Do Amaral Martins .................... C08F 2/24 524/800 |
| 2008/0146743 | A1 | 6/2008 | Minge et al. |
| 2011/0046294 | A1 | 2/2011 | Minge et al. |
| 2017/0121442 | A1 * | 5/2017 | Galvan-Miyoshi ......................... C08F 283/124 |

FOREIGN PATENT DOCUMENTS

| DE | 102005000824 A1 | 7/2006 | |
| DE | 102008002570 A1 | 12/2009 | |
| EP | 0352339 A1 | 1/1990 | |
| EP | 0771826 A2 | 5/1997 | |
| EP | 0943634 A1 * | 9/1999 | ............ C08F 283/12 |
| EP | 0943634 A1 | 9/1999 | |
| EP | 1197502 A2 | 4/2002 | |
| EP | 1256611 A2 | 11/2002 | |
| EP | 1308468 A1 | 5/2003 | |
| WO | 0142311 A1 | 6/2001 | |

OTHER PUBLICATIONS

Session J, Fox T.G. Bull. Am. Physics Soc. 1, 3, 1956, p. 123.
Polymer Properties, Thermal Transitions of Homopolymers, Sigmaaldrich, Table 1, General Information, 2 pages (pp. 52-53).
Dong-ming Qi et al., Polymer 47, "Preparation of acrylate polymer/silica nanocomposite particles with high silica encapsulation efficiency via miniemulsion polymerization," Elsevier, May 19, 2006, 8 pages.
Dissertation, Nicht-wässrige Emulsionspolymerisationen, Kevin Müller, Mainz 2008, 8 pages.

* cited by examiner

*Primary Examiner* — Satya B Sastri
(74) *Attorney, Agent, or Firm* — Brooks Kushman P.C.

(57) ABSTRACT

Aqueous dispersions of copolymers of ethylenically unsaturated monomers and silicone resins bearing functional groups which are free radically polymerizable are prepared by forming an aqueous miniemulsion of the silicone resin dissolved in an ethylenically unsaturated monomer, the miniemulsion having a $D_{50}$ droplet size <350 nm, and polymerizing using a free radical polymerization initiator.

20 Claims, No Drawings

ORGANOCOPOLYMER DISPERSIONS

CROSS REFERENCE TO RELATED APPLICATIONS

This application is the U.S. National Phase of PCT Appln. No. PCT/EP2016/078598 filed Nov. 23, 2016, which claims priority to German Application No. 10 2015 223 246.8 filed Nov. 24, 2015, the disclosures of which are incorporated in their entirety by reference herein.

BACKGROUND OF THE INVENTION

1. Field of the Invention

The invention relates to copolymers of ethylenically unsaturated monomers and ethylenically functionalized silicone resins in the form of aqueous dispersions, and to their preparation and use.

2. Description of the Related Art

Silicone resins are used for the chemical modification of organic polymers, or as binders for coatings, in order to increase the resistance of the coatings with respect, for example, to weathering effects, chemical attack, and thermal exposure. Products available commercially are, for example, silicone polyesters composed of silicone resins and organic polymers, of the kind used for producing coatings on metal strip. These products are preferably prepared by chemical reaction and bond formation between the silicone resin and the organic polymer. Chemical attachment of the silicone resins to the organic polymer here is accomplished generally with formation of an Si—O—C bridge between the two, which customarily takes place in a solvent.

For aqueous media, the literature knows of various products comprising combinations of organic polymers with silicone resins or resin-like oligomeric silicone structures, and methods for producing them. EP 1 256 611 A2 and EP 1 197 502 A2 teach, for example, the production of an aqueous resin emulsion by radical polymerization of ethylenically unsaturated organic monomers in the presence of silanes which can be hydrolyzed and are amenable to condensation but are not radically polymerizable. For use as coating compositions, EP 943 634 A1 describes aqueous latices which are produced by copolymerizing ethylenically unsaturated monomers in the presence of a silicone resin containing silanol groups. In this case, interpenetrating networks (IPN) are formed between the polymer chains and the polysiloxane chains.

The silicone resin emulsion polymers obtainable by these methods, and also the otherwise well-known physical mixtures of silicone resin emulsions and organic polymer dispersions, which are used, for example, in the area of silicone resin masonry paints, are notable for the fact that the silicone resin and the organic polymer are present almost exclusively in the form of physical blends. Any formation of chemical bonds between the silicone component and the organic component is by chance, and involves Si—O—C bonds, which are susceptible to hydrolysis. The Si—O—C bond in this case is always competing with the formation of the Si—O—Si bridges through condensation of the silanol groups with one another.

While alkoxy-functional silanes or siloxane building blocks have a low degree of condensation, a low viscosity, and are readily manageable synthesis building blocks, the condensation reactions of the silane building blocks or of their hydrolyzed and partially condensed oligomers cannot be adequately controlled under the hydrolytic conditions of an emulsion polymerization. Under hydrolytic conditions it is known that, in particular, alkoxysilanes having short, oxygen-bonded alkyl radicals possess a pronounced tendency to undergo condensation to the point of forming solid particles. These particles tend to form precipitates and domains, and hence tend toward separation. The greater the number of alkoxy groups bonded on the silicon, the more pronounced this tendency is. In the case of application as a coating material, these tendencies may have the adverse effect of formation of specks. Separation means that the products tend to suffer reductions in their storage stability and serviceability.

A more definite attachment of the silicone building block to the organic polymer ought to take place via the formation of C—C bonds through copolymerization of double-bond-functionalized silicones with organic monomers. Approaches of this kind using linear ethylenically unsaturated polyorganosiloxanes are described in a variety of specifications. For example, EP 1 308 468 A1 teaches hydrophobically modified copolymers, which are obtained by copolymerizing linear silicones having up to two polymerizable groups with organic monomers in emulsion. A similar approach is pursued by EP 352 339 A1, where vinyl-terminated, linear polydimethylsiloxanes are copolymerized with (meth)acrylate monomers.

EP 771 826 A2 describes the emulsion polymerization of (meth)acrylic esters and vinylaromatics, where difunctional silicones containing acrylic groups or vinyl groups are added for crosslinking. U.S. Pat. No. 5,618,879 A pursues this approach as well, and describes reactive aqueous copolymer dispersions which, however, are confined to graft copolymers, formed from organopolysiloxanes having two different functional groups of which at least one is ethylenically unsaturated, with ethylenically unsaturated monomers. The graft copolymers are obtained by radical emulsion polymerization or microsuspension polymerization of the ethylenically unsaturated monomers in the presence of the functional organopolysiloxanes. U.S. Pat. No. 5,618,879 A does in principle allow both linear polyorganosiloxanes and silicone resins, however the proportion of highly crosslinked Q segments in the polyorganosiloxane reactants is limited in U.S. Pat. No. 5,618,879 to below 30%.

The mere presence of the silicone resin during the radical polymerization of the organic monomers does not, however, mean that a chemical bond is also actually produced between the silicone and the organic polymer which forms. In order to understand this, it is necessary to take a closer look at the known mechanisms of radical polymerizations in an aqueous environment. In view of the known incompatibility between silicone polymers and organic polymers, it is obvious to assume formation of a two-phase product, consisting of a silicone phase and an organic polymer phase, with no chemical bonds between the two phases. Bearing in mind in particular that, in standard methods of radical emulsion polymerizations, the polymerization reaction of the organic monomers begins in the water phase, resulting in formation of further-growing micelles, which are supplied with further monomer via the water phase, a copolymerization between a hydrophobic silicone oligomer or silicone polymer, which is unable to access water, by the route of regular radical emulsion polymerization appears fairly unlikely, unless special measures are taken which force a true copolymerization. In the aforementioned specifications, however, no such measures are adopted. In the standard method of radical emulsion polymerization, the emulsion droplets formed primarily during emulsion preparation otherwise become depleted in organic monomer, until finally only the silicone remains, which is able only to polymerize with itself and which so forms a separate phase. If a dispersion of this kind is dried by evaporation of the water, the result is a silicone phase and an organic polymer phase, which are not connected to one another. Since phase separation is brought about during the polymerization procedure, the postulation of interpenetrating networks for products obtained by this route is gratuitous.

Suitable measures which promote or bring about copolymerization between the silicone and the organic monomer component must at any event rule out exclusive or predominant polymerization which includes a transfer of reactant through the water phase. In other words, polymerization must take place in the droplets of reactant or monomer, as is the case for suspension polymerizations with oil-soluble initiators. Suspension polymerization is common in particular for the preparation of vinyl chloride polymers. The suspension polymerization leads to significantly larger particles than the emulsion polymerization (suspension polymerization ≥50 μm, emulsion polymerization <1 μm) and a significantly larger particle size distribution. In the case of suspension polymerization, moreover, lower molecular masses are achieved than in the case of emulsion polymerization. As a result, the products of the suspension polymerization are the preserve of fields of application different from those for products of an emulsion polymerization.

In order to obtain relatively small particle sizes in suspension polymerization, which in terms of its process may be regarded as a bulk polymerization in water, the possibility exists of microsuspension polymerization, which allows particle sizes of ≥1 μm, in conjunction with the broad particle size distribution to be expected of suspension polymers, and which therefore already moves into the upper range of emulsion polymerization. Smaller particle sizes with a narrow distribution are then possible only by means of emulsion polymerization.

Small-particle copolymer dispersions of particles and silicones, including silicone resins, with organic polymers, prepared by radical polymerization, are taught by U.S. Pat. No. 7,674,868 B2. In this case the copolymerization between the silicone resin and the organic polymer component is achieved in a miniemulsion polymerization. Particle sizes in the region of less than 100 nm are obtained. The organic monomer is polymerized in the presence of the olefinically unsaturated silicone resin. A combination of water-soluble and oil-soluble initiators ensures that polymerization takes place both in the monomer droplets and in the water phase. A particular feature of this invention according to U.S. Pat. No. 7,674,868 B2 is that it operates only when the olefinically unsaturated function on the silicone resins is achieved through the use of the specific class of alpha-silanes which possess a carbon group having precisely one carbon atom between the silicon atom and the organofunctional radical. Alpha-silanes possess a reaction behavior different from that of silanes having longer spacers between the silicon atom and the organic functional groups. In this case as well, the special position of this group has been utilized in order to prepare the target products. In view of the relatively high reactivity, particularly of silicon-bonded alkoxy groups of alpha-silanes, the likelihood is of a limited storage stability in an aqueous environment. Another disadvantage is that ethylenically unsaturated alpha-silanes are significantly more expensive than silanes having longer spacer groups between the organic function and the silicon atom, a fact which also drives up the production costs for the silicone resins in question. Broad implementation of the invention according to U.S. Pat. No. 7,674,868 B2, therefore, is opposed by both technical and economic reasons. To date there is no known product on the market that utilizes the technology according to U.S. Pat. No. 7,674,868 B2.

SUMMARY OF THE INVENTION

It was an object of the present invention to improve on the prior art by providing stable, especially storage-stable, finely divided silicone-resin organocopolymers in the form of their aqueous dispersions, in which the silicone resin is bonded to the organic polymer component, the bond in question being an Si—C bond which is stable toward hydrolysis, and the copolymers being accessible from readily available and economically advantageous raw materials.

A further object further was to provide storage-stable, finely divided silicone-resin organocopolymers, in the form of their aqueous dispersions, which are notable for being able to be used, both on mineral substrates and on wooden substrates, as binders for both porous and film-forming coatings, while both allowing the spreading of water on their surface for rapid evaporation thereof, and, at the same time, raising the water retention capacity of the coatings, in other words preventing the ingress of water into the substrate by penetration through the coating, this combination of properties being achievable with application of only a single coating composition.

The foregoing objects and others are achieved by the invention, which provides aqueous dispersions of copolymers of ethylenically unsaturated monomers and of ethylenically functionalized silicone resins, obtainable by means of radically initiated miniemulsion polymerization in aqueous medium of (A) one or more monomers from the group encompassing vinyl esters, (meth)acrylic esters, vinylaromatics, olefins, 1,3-dienes, vinyl ethers, and vinyl halides, and optionally further monomers copolymerizable therewith, in the presence of (B) at least one silicone resin which is functionalized with ethylenically unsaturated, radically polymerizable groups and consists of siloxane units of the general formula

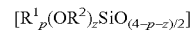 (I), where $R^1$ is identical or different at each occurrence and is a radical R* or E, where R* is identical or different at each occurrence and is a hydrogen atom or is a hydrocarbon radical which is free from aliphatic multiple C—C bonds, has 1 to 18 carbon atoms, preferably a $C_1$-$C_{18}$ alkyl, $C_6$-$C_{18}$ cycloalkyl or $C_6$-$C_{18}$ aryl radical, and may optionally be substituted, R* preferably being at least two different hydrocarbon radicals which are free from aliphatic multiple C—C bonds and have 1 to 18 carbon atoms, and E is an ethylenically unsaturated radical of the formula —$(CR^5{}_2)_m$—X, preferably —$(CH_2)_3$—X, where m is an integer greater than or equal to 2, preferably 2 to 10, more preferably 3, $R^2$ is identical or different at each occurrence and is a hydrogen atom or a hydrocarbon radical having 1 to 18 carbon atoms, preferably a $C_1$-$C_{18}$ alkyl or $C_6$-$C_{18}$ cycloalkyl radical, $R^5$ is a hydrogen atom, a $C_1$-$C_{12}$ alkyl radical or a $C_6$-$C_{18}$ aryl radical, preferably a hydrogen atom, and X is an ethylenically unsaturated organic group, and $R^1$ is an ethylenically unsaturated radical E in at least 1 mol % and at most 50 mol % of all siloxane units (I), p is 0, 1, 2 or 3, and
z is 0, 1, 2 or 3,
  where the sum p+z has a value of 0, 1, 2 or 3, with the proviso that for at least 20 mol %, preferably for at least 30 mol %, of all siloxane units of the formula (I) in the silicone resin (B), the sum p+z is 1 or 0, with p being 1 or 0 and z being 0,
the miniemulsion polymerization being carried out by preparation in the first step of a solution of at least one silicone resin (B) in one or more ethylenically unsaturated monomers (A), to give a silicone resin-in-monomer solution, emulsification in the second step of the resulting silicone resin-in-monomer solution, using emulsifiers, optionally hydrophobic coemulsifiers, and optionally polymerization inhibitors which prevent premature radical emulsion polymerization, in water in such a way as to give a miniemulsion having a particle size D(50) of not more than 350 nm, preferably not more than 300 nm, more preferably not more than 250 nm, and most preferably not more than 200 nm, and subjection in the third step of the resulting miniemulsion to radical emulsion polymerization, where the miniemulsion polymerization is carried out using water-soluble or oil-soluble, or a mixture of water-soluble and oil-soluble, polymerization initiators.

A further subject of the invention is a method for producing aqueous dispersions of copolymers of ethylenically unsaturated monomers and of ethylenically functionalized silicone resins by means of radically initiated miniemulsion polymerization in aqueous medium of
(C) one or more monomers from the group encompassing vinyl esters, (meth)acrylic esters, vinylaromatics, olefins, 1,3-dienes, vinyl ethers, and vinyl halides, and optionally further monomers copolymerizable therewith, in the presence of
(D) at least one silicone resin which is functionalized with ethylenically unsaturated, radically polymerizable groups and consists of siloxane units of the general formula

$[R^1_p(OR^2)_z SiO_{(4-p-z)/2}]$ (I), where $R^1$ is identical or different at each occurrence and is a radical R* or E, where
  R* is identical or different at each occurrence and is a hydrogen atom or is a hydrocarbon radical which is free from aliphatic multiple C—C bonds, has 1 to 18 carbon atoms, preferably a $C_1$-$C_{18}$ alkyl, $C_6$-$C_{18}$ cycloalkyl or $C_6$-$C_{18}$ aryl radical, and may optionally be substituted, R* preferably being at least two different hydrocarbon radicals which are free from aliphatic multiple C—C bonds and have 1 to 18 carbon atoms, and
  E is an ethylenically unsaturated radical of the formula $—(CR^5_2)_m—X$, preferably $—(CH_2)_3—X$, where
  m is an integer greater than or equal to 2, preferably 2 to 10, more preferably 3,
  $R^2$ is identical or different at each occurrence and is a hydrogen atom or a hydrocarbon radical having 1 to 18 carbon atoms, preferably a $C_1$-$C_{18}$ alkyl or $C_6$-$C_{18}$ cycloalkyl radical,
  $R^5$ is a hydrogen atom, a $C_1$-$C_{12}$ alkyl radical or a $C_6$-$C_{18}$ aryl radical, preferably a hydrogen atom, and
  X is an ethylenically unsaturated organic group,
  and $R^1$ is an ethylenically unsaturated radical E in at least 1 mol % and at most 50 mol % of all siloxane units (I),
p is 0, 1, 2 or 3, and
z is 0, 1, 2 or 3,
  where the sum p+z has a value of 0, 1, 2 or 3,
  with the proviso that for at least 20 mol %, preferably for at least 30 mol %, of all siloxane units of the formula (I) in the silicone resin (B), the sum p+z is 1 or 0, with p being 1 or 0 and z being 0,
the miniemulsion polymerization being carried out by preparation in the first step of a solution of at least one silicone resin (B) in one or more ethylenically unsaturated monomers (A), to give a silicone resin-in-monomer solution, emulsification in the second step of the resulting silicone resin-in-monomer solution, using emulsifiers, optionally hydrophobic coemulsifiers, and optionally polymerization inhibitors which prevent premature radical emulsion polymerization, in water in such a way as to give a miniemulsion having a particle size D(50) of not more than 350 nm, preferably not more than 300 nm, more preferably not more than 250 nm, and most preferably not more than 200 nm, and subjection in the third step of the resulting miniemulsion to radical emulsion polymerization, where the miniemulsion polymerization is carried out using water-soluble or oil-soluble, or a mixture of water-soluble and oil-soluble, polymerization initiators.

DETAILED DESCRIPTION OF THE PREFERRED EMBODIMENTS

The aqueous dispersions of copolymers of the invention can be subjected subsequently to drying, to give redispersible polymer powders.

A further subject of the invention are aqueous construction coating compositions comprising the aqueous dispersions of copolymers of the invention, where silicone resins (B) used are preferably those constructed to an extent of at least 20 mol %, preferably at least 30 mol %, of T units and/or Q units, with T units being siloxane units of the formula (I) where p is 1 and z is 0, and Q units being siloxane units of the formula (I) where p is 0 and z is 0.

The aqueous, silicone-resin-containing organocopolymer dispersion of the invention acts as a binder in the construction coating composition. A synergistic boosting of the properties of the organic polymer and of the silicon-based component is observed in this case. This means that typically, alongside high binding capacity and high-grade mechanical properties on the part of the polymer, the stability properties of the silicone portion are found. In particular, the construction coating compositions of the invention are notable for producing coatings having significantly improved antiblocking characteristics and hence reduced dirt pickup propensity. Moreover, they allow targeted setting and fine-tuning of the properties of surface hydrophobicity and surface hydrophilicity, this feature always being observed, surprisingly, in combination with a good water blocking effect. With the aid of these binders, accordingly, success is achieved in producing coating systems which, in a single-coat application, provide a coating which not only results in an effective barrier against the penetration of water but also produces a sufficiently hydrophilic surface, which allows the spreading of water to form a film. It is common knowledge that thin films of water evaporate more rapidly than the water droplets which form on hydrophobic surfaces. Consequently, on average, coatings obtained using the silicone resin-organocopolymer dispersions of the invention are dryer than purely hydrophobic or purely hydrophilic coatings. The latter allow water to penetrate into the coated surface, and so lead to dampening of the construction material. Since the coatings in question are obtained by means of a single application process and do not require first a hydrophobic, water-barrier coating and thereafter a hydrophilic, water-spreading coating, silicone resin-organocopolymer dispersions of the invention are notable for particular economy of use. If a coating is desired which has both water barrier qualities and surface hydrophobicity, this can be achieved by appropriate addition of a hydrophobizing additive. In that case, for example, adding a silicone resin can be carried out, said the silicone resin corresponding to that used in accordance with the invention for the copolymerization, in which case the ethylenically unsaturated function is avoidable here; in other words, there is no need to attach the ethylenically unsaturated function when preparing the silicone resin used for hydrophobic modification. This has the advantage that these silicone resins are able to interact chemically, via any alkoxy groups or hydroxyl groups present, with the corresponding functionalities of the alkoxy and hydroxyl functions which are bonded on the copolymer and are not needed for the copolymer synthesis, the resin thus being anchored permanently in the surface.

In contrast to construction coating compositions which contain only silicone resin which has been mixed in physically, the silicone resins and the organic polymers of the silicone resin-organocopolymer dispersions of the invention mean that in construction coating materials there are no instances of incompatibility, uneven distribution or subsequent phase separation.

In addition, the properties consistently expected of construction coatings, such as high storage stability, weathering stability and long life, are found.

With the silicone resin-copolymer dispersions of the invention, both film-forming and porous coatings can be realized, depending on the pigment volume concentration selected for the formulation.

As a result of the copolymerization of silanes containing hydrolysable and condensable groups into the copolymer, binders can be prepared which following application are moisture-curing, thereby allowing adjustment of the film hardnesses, the thermoplasticity, and the dirt pickup propensity.

The construction coating materials of the invention can be used both on mineral substrates and on wood.

Ethylenically unsaturated monomers (A) include vinyl esters, preferably those of carboxylic acids having 1 to 15 carbon atoms. Preferred are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, as for example VeoVa9® or VeoVa10® (trade names of Resolution). Particularly preferred is vinyl acetate.

Suitable monomers from the group of acrylic esters or methacrylic esters include esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate, and norbornyl acrylate. Particularly preferred are methyl acrylate, methyl methacrylate, n-butyl acrylate, isobutyl acrylate, tert-butyl acrylate, 2-ethylhexyl acrylate, and norbornyl acrylate.

Preferred vinylaromatics are styrene, alpha-methylstyrene, the isomeric vinyltoluenes and vinylxylenes, and also divinylbenzenes. Particularly preferred is styrene.

The vinyl halogen compounds include vinyl chloride, vinylidene chloride, and also tetrafluoroethylene, difluoroethylene, hexylperfluoroethylene, 3,3,3-trifluoropropene, perfluoropropyl vinyl ether, hexafluoropropylene, chlorotrifluoroethylene, and vinyl fluoride. Particularly preferred is vinyl chloride. An example of a preferred vinyl ether is methyl vinyl ether.

The preferred olefins are ethene, propene, 1-alkylethenes, and also polyunsaturated alkenes, and the preferred dienes are 1,3-butadiene and isoprene. Particularly preferred are ethene and 1,3-butadiene.

Optionally it is further possible for 0.1 to 5 wt % of auxiliary monomers to be copolymerized, based on the total weight of the monomers (A). Preference is given to using 0.5 to 2.5 wt % of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide such as diacetoneacrylamide (DAAM) and acrylonitrile; monoesters and diesters of fumaric acid and maleic acid such as the diethyl and diisopropyl esters and also maleic anhydride, ethylenically unsaturated sulfonic acids and their salts, preferably vinylsulfonic acid, 2-acrylamido-2-methylpropanesulfonic acid. Further examples are precrosslinking comonomers such as polyethylenically unsaturated comonomers, examples being divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are comonomers with epoxide functionality such as glycidyl methacrylate and glycidyl acrylate. Mention may also be made of monomers having hydroxyl or CO groups, examples being hydroxyalkyl esters of acrylic and methacrylic acid, such as hydroxyethyl, hydroxypropyl or hydroxybutyl acrylate or methacrylate, and also compounds such as diacetoneacrylamide and acetylacetoxyethyl acrylate or methacrylate.

Particularly preferred as comonomers (A) are one or more monomers from the group of vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene. Also particularly preferred as comonomers (A) are mixtures of vinyl acetate and ethylene; mixtures of vinyl acetate, ethylene, and a vinyl ester of α-branched monocarboxylic acids having 9 to 11 carbon atoms; mixtures of n-butyl acrylate and 2-ethylhexyl acrylate and/or methyl methacrylate; mixtures of styrene and one or more monomers from the group of methyl acrylate, ethyl acrylate, propyl acrylate, n-butyl acrylate, 2-ethylhexyl acrylate; mixtures of vinyl acetate and one or more monomers from the group of methyl acrylate, ethyl acrylate, propyl acrylate, n-butyl acrylate, 2-ethylhexyl acrylate, and optionally ethylene; and mixtures of 1,3-butadiene and styrene and/or methyl methacrylate; the stated mixtures may optionally further include one or more of the aforementioned auxiliary monomers.

The monomer selection, or the selection of the weight fractions of the comonomers, is made here so as to result in general in a glass transition temperature Tg of preferably ≤60° C., more preferably −50° C. to +60° C., very preferably −30° C. to +50° C., more particularly 0° C. to 30° C. The glass transition temperature Tg of the polymers can be determined in a known way by means of differential scanning calorimetry (DSC). The Tg may also be calculated approximately in advance using the Fox equation. According to Fox T. G., Bull. Am. Physics Soc. 1, 3, page 123

(1956): $1/T_g = x_1/T_{g1} + x_2/T_{g2} + \ldots + x_n/T_{gn}$, where xn is the mass fraction (wt %/100) of the monomer n, and Tgn is the glass transition temperature in kelvins of the homopolymer of the monomer n. Tg values for homopolymers can be found in numerous literature references and standard works of polymer technology, and in tabular works which can be searched on the Internet, such as, for instance, from Aldrich under the entry "Polymer Properties, Thermal Transitions of Homopolymers" (https://www.sigmaaldrich.com/content/dam/sigma-aldrich/docs/Aldrich/General_Information/thermal_transitions_of_homopolymers.pdf).

The fraction of the comonomers (A) in the construction of the copolymers of the invention is preferably ≥20 wt %, more preferably 30 to 95 wt %, based in each case on the total weight of (A) and functionalized silicone resin (B). This means that the fraction of (B) is preferably <80%, more preferably 5-70 wt %, based on the total weight of (A) and functionalized silicone resin (B).

Particularly preferred silicone resins (B) are those for which p and z in the general formula

　　　　　(I)

have the definition of p=0 or 1 and z=0, 1 or 2, it being the case always that for at least 20 mol % of all siloxane units of the formula (I), p=1 and z=0 or p=0 and z=0, this condition being met preferably, for p=1 and z=0, for at least 30 mol %, more preferably for at least 35 mol % and most preferably for at least 40 mol %, of all siloxane units (I). It is preferred, moreover, for the siloxane units (I) to contain not more than 50 mol % of what are called Q units, for which p=0 and z=0.

Also suitable, furthermore, are those silicone resins which consist of any desired combination of M units ($R_3SiO_{1/2}$), D units ($R_2SiO_{2/2}$), T units ($RSiO_{3/2}$), and Q units ($SiO_{4/2}$), where R is a radical $R^1$ or radical $-OR^2$, and $R^1$ and $R^2$ have the definition indicated for them above, with the proviso that there are always at least 20 mol % of T units or Q units as per formula (I) for which p=1 and z=0 or p=0 and z=0.

Silicone resins (B) to which maximum preference is given are those which are composed essentially only of T or Q units and D units, with the molar ratio of T/D units being preferably greater than 50/50, more particularly greater than 70/30, and with particular preference only T units without D units, up to a molar ratio of T/D units of up to 20/80. Silicone resins to which maximum preference is given, furthermore, are those which consist predominantly of T units, more preferably those which consist to an extent of at least 80 mol % of T units, and most preferably those which consist to an extent of at least 90 mol % of T units. The preferred silicone resins, moreover, are those which carry a small fraction of silicon-bonded alkoxy groups. The synthesis method employed is tolerant toward hydrolyzable alkoxy groups, and so the alkoxy groups are not substantially hydrolyzed; in other words, essentially no hydroxyl groups which are eliminated in the form of water by condensation, leaving behind an Si—O—Si unit, are formed from the alkoxy groups. It is nevertheless preferred for the functional silicone resins used to have a low content of groups of the type $R^2O$, where $R^2$ has the definition indicated for it above, in accordance with formula (I). The greater the number of alkoxy groups present, the lower the degree of condensation of the silicone resin. A high degree of condensation is preferred, since for a given substitution pattern it generally corresponds to a higher glass transition temperature. The higher the glass transition, the less the extent to which the silicone resin components of the copolymer tend to soften, this being an advantage with construction coatings, since in this way a lower soiling propensity can be achieved even in conjunction with relatively high service temperatures.

At least 1 mol % and preferably at most 50 mol %, more preferably at most 40 mol %, of all siloxane units of the formula (I) comprise as their radical $R^1$ an ethylenically unsaturated radical E.

The radical X may be linear, branched or cyclic. In addition to the double bond, further functional groups may also be present, generally being inert toward an olefinic polymerization, examples being halogen, carboxyl, sulfinato, sulfonato, amino, azido, nitro, epoxy, alcohol, ether, ester, thioether and thioester groups, and also aromatic isocyclic and heterocyclic groups. Preferred examples of radicals X are monounsaturated $C_2$ to $C_{10}$ radicals; maximum preference as radical X is for the acrylic and methacrylic radicals.

The hydrocarbon radicals R* free from aliphatic multiple C—C bonds may be, for example, alkyl, cycloalkyl or aryl radicals. Examples of radicals R* are therefore alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, hexadecyl radicals, and octadecyl radicals such as the n-octadecyl radical; cycloalkyl radicals, such as cyclopentyl, cyclohexyl, cycloheptyl, and methylcyclohexyl radicals; aryl radicals, such as the phenyl, naphthyl, anthryl, and phenanthryl radical; alkaryl radicals such as tolyl radicals, xylyl radicals, and ethylphenyl radicals; and aralkyl radicals, such as the benzyl radical and the β-phenylethyl radical. Particularly preferred radicals R* are the methyl, the isooctyl, the propyl, and the phenyl radical. This recitation is only illustrative and should not be understood as imposing any restriction.

If the radicals R* are substituted, they may additionally contain one or more identical or different heteroatoms selected from O, S, Si, Cl, F, Br, P or N atoms.

Examples of radicals R* are valid in full for radicals $R^2$.

Examples of alkyl radicals R* having 1 to 12 carbon atoms and aryl radicals R* having 6 to 18 carbon atoms are valid in full for $C_1$-$C_{12}$ alkyl and $C_6$-$C_{18}$ aryl radicals $R^5$.

In one preferred embodiment of the invention there are two different radicals R* present in the silicone resins composed of siloxane units (I).

Examples of preferred combinations of radicals R* are the phenyl radical and the methyl radical, the n-butyl radical and the ethyl radical, the n-butyl radical and the methyl radical, the ethyl radical and the methyl radical, the n-octyl radical and the methyl radical, the isooctyl radical and the methyl radical, the isooctyl radical and the phenyl radical, the n-octyl radical and the phenyl radical, the n-octyl radical and the ethyl radical, the phenyl radical and the ethyl radical, the isooctyl radical and the ethyl radical; the combination of phenyl radical and methyl radical, ethyl radical and methyl radical, and isooctyl radical and methyl radical, ethyl radical and isooctyl radical, and phenyl radical and isooctyl radical are particularly advantageous. A combination of methyl and isooctyl radicals and of methyl and phenyl radicals as the two different radicals R* has proven to be particularly effective. With these two radical combinations it is possible to best control and set the two properties of compatibility in the polymer matrix and high glass transition temperature. Moreover, they ideally meet the requirements for availability and economy.

It is preferred, and has proven to be particularly advantageous, if the siloxane unit (I) having the more carbon-rich substituent is present at not more than 75 mol % of all siloxane units of the formula (I). This means, conversely, that the siloxane unit (I) having the more carbon-poor substituent is present in not less than 25 mol % of all siloxane units of the formula (I). In one particularly preferred embodiment of the invention, the siloxane units of the formula (I) having the more carbon-poor substituent are present in the majority, i.e., at more than 50 mol % of all siloxane units of the formula (I), and therefore carbon-rich substituents are present in the minority, i.e., at less than 50 mol % of all siloxane units of the formula (I).

Carbon-rich substituents R* are carbon-hydrogen radicals, such as alkyl, cycloalkyl or aryl radicals, having 4 to 18 carbon atoms, preferably 6 to 18 carbon atoms, more preferably the isooctyl radical and the phenyl radical, and carbon-poor substituents R* are alkyl radicals having 1 to 3 carbon atoms, preferably the methyl radical.

All ratio figures given are standardized to 100 mol % as the sum of the units of the formula (I) carrying different carbon-rich Si—C bonded radicals.

In the case of the combination of isooctyl radical and methyl radical, it is preferred for there to be more siloxane units of the formula (I) which carry methyl radicals than those which carry isooctyl radicals. The ratio of the number of siloxane units of the formula (I) which carry methyl radicals to the number of siloxane units of the formula (I) which carry isooctyl radicals is preferably 51:49 to 99:1, more preferably 55:45 to 98:2, and most preferably 60:40 to 98:2.

Ratios which have proven to be particularly effective are 60:40, 70:30, 90:10, and 95:5.

All these figures are standardized to 100 as the sum of the units of the formula (I) that carry methyl groups and that carry isooctyl groups.

In the case of the combination of phenyl radicals and methyl radicals, ratios below for the number of siloxane units of the formula (I) which carry methyl radicals to the number of siloxane units of the formula (I) which carry phenyl radicals are preferably 51:49 to 99:1, more preferably 55:45 to 98:2, and most preferably 60:40 to 98:2.

Ratios which have proven to be particularly effective are 60:40, 70:30, 80:20, 90:10, and 95:5.

All these figures are standardized to 100 as the sum of the units of the formula (I) that carry methyl groups and that carry phenyl groups.

The combination of more than two different radicals is also possible and inventive. In that case the preferred ratios stated above for the combination of two different radicals are valid mutatis mutandis if the carbon-rich substituted siloxane units are counted together and are placed in a ratio to the siloxane unit which carries the smallest, or the least carbon-rich, substituent; in this context, a distinction is to be made, in the manner set out above, between combinations involving aromatic substituents and those not involving aromatic substituents.

In the case where more than two different siloxane units of the formula (I) are present, also, preferred combinations are those of methyl, n-propyl, phenyl, n-butyl, n-octyl, and isooctyl radicals, more particularly of methyl, n-propyl, phenyl, and isooctyl radicals, and most preferably of methyl, phenyl, n-propyl, and isooctyl radicals.

The ethylenically unsaturated group can be attached to the silicone resin S through the condensation of a silane of the formula (II) with the silicone resin S, $$(R^3O)_{3-n}(R^4)_nSi-(CR^5_2)_m-X \qquad (II)$$

where $R^3$ is a hydrogen atom, a $C_1$-$C_6$ alkyl radical or a $C_6$-$C_{18}$ aryl radical,
$R^4$ is a hydrogen atom, a $C_1$-$C_{12}$ alkyl radical or a $C_6$-$C_{18}$ aryl radical,
$R^5$ is a hydrogen atom, a $C_1$-$C_{12}$ alkyl radical or a $C_6$-$C_{18}$ aryl radical, preferably a hydrogen atom,
n is 0, 1 or 2,
m is an integer greater than or equal to 2, preferably from 2 to 10, more preferably 3, and
X is an ethylenically unsaturated organic group.

It is preferred here for n to possess a value of 0 or 1, and with particular preference n=0; i.e., a trialkoxysilane. They not only are the most simply and economically available, but also make a contribution to the condensation of the resins, meaning that they may contribute to increasing the degree of condensation and hence the glass transition temperature of the resulting resin.

In formula (II) the radicals $R^3$ and $R^4$ are preferably unsubstituted alkyl groups having 1 to 6 carbon atoms, preferably a methyl, ethyl or propyl radical, more particularly a methyl or ethyl radical, especially a methyl radical, and the radical $R^5$ is preferably hydrogen. The radical X may be linear, branched or cyclic. Besides the double bond, there may also be other functional groups present, which are generally inert toward an olefinic polymerization, examples being halogen, carboxyl, sulfinato, sulfonato, amino, azido, nitro, epoxy, alcohol, ether, ester, thioether, and thioester groups, and also aromatic isocyclic and heterocyclic groups. Preferred examples of X are monounsaturated $C_2$ to $C_{10}$ radicals; most preferred as radicals X are alkenylcarbonyloxy radicals, such as the acryloyloxy and methacryloyloxy radical.

Preferred silanes (II) are the silanes of the formula $$(R^6O)_3Si(CH_2)_3OC(=O)(CH_3)=CH_2,$$

where $R^6$ is a $CH_3$ group or a $CH_3$—$CH_2$ group,
i.e., preferred silanes are 3-methacryloyloxypropyltrimethoxysilane or 3-methacryloyloxypropyl-triethoxysilane.

Silicone resin S, functionalized with ethylenically unsaturated groups by condensation with a silane of the formula (II), is preferably a resin constructed of siloxane units of the formula $$[R_{(p+z)}SiO_{(4-p-z)/2}] \qquad (III)$$

where R is identical or different and is a radical R* or a radical —$OR^2$,
where R*, $R^2$, p, and z have the definitions stated for them above,
with the proviso that in at least 20 mol %, preferably in at least 30 mol %, of all siloxane units of the formula (III) in the silicone resin S, the sum p+z is 1 or 0, with p being 1 or 0 and z being 0.

Silicone resins can also be functionalized in other known ways, however, such as, for example, by the hydrosilylation of a suitable organic species onto an Si—H-functional silicone resin, or by the route of the condensation of an ethylenically unsaturated organic molecule onto a carbinolfunctional silicone resin species. In principle there are no restrictions here, meaning that the synthesis is not confined technically to the use of silanes. From the standpoints of economy and simplicity, however, it is preferred for the ethylenically unsaturated group to be implemented by the cocondensation of the silicone resin with an alkoxy-functional silane, in which case, again for reasons of economy and availability, particular preference is given to the use of gamma-silanes having a spacer composed of exactly three carbon atoms, i.e., m=3 in formula (II), between the silicon atom and the functional group containing the ethylenic group.

Surprisingly, and in contrast to the existing prior art, it has been found that the readily available gamma-silanes are very suitable for implementing the invention, in spite of the lower reactivity of the gamma-silanes as compared with the alpha-silanes. It has been found that the invention is in principle also possible with small amounts of gamma-silanes used for functionalizing the silicone resins S, of only 1.0 wt % of silane, based on the total amount of silicone resin S used, but it has emerged that for the purpose of the more complete incorporation of the silicone resin it is advantageous to use at least 1.5 wt % of gamma-silane, preferably at least 2.0 wt %, more preferably at least 2.5 wt % of gamma-silane, and yet more preferably at least 3.0 wt % of gamma-silane; the most-preferred amount is between 4 and 8 wt %, since it is in this range that the best balance is obtained between efficiency and economy.

In the polymer dispersions of the invention there may additionally be up to 30 wt %, based on the total weight of the components (A) and (B), of at least one silane of the general formula $(R^7)_{4-g}Si(OR^8)_g$ (III), where
g is a number with a value of 1, 2, 3 or 4,
$R^7$ is an organofunctional radical selected from the group of alkoxy radical and aryloxy radical having in each case 1 to 12 carbon atoms, phosphonic monoester radical, phosphonic diester radical, phosphonic acid radical, methacryloyloxy radical, acryloyloxy radical, vinyl radical, mercapto radical, isocyanato radical, where the isocyanato radical may optionally be reaction-blocked to protect it from chemical reactions; hydroxyl radical, hydroxyalkyl radical, vinyl radical, epoxy radical, glycidyloxy radical, morpholino radical, piperazino radical, a primary, secondary or tertiary amino radical with one or more nitrogen atoms, where the nitrogen atoms may be substituted by hydrogen or by monovalent aromatic, aliphatic or cycloaliphatic hydrocarbon radicals; carboxyl radical, carboxylic anhydride radical, aldehyde radical, urethane radical, urea radical, where the radical $R^7$ may be bonded directly to the silicon atom or may be separate therefrom through a carbon chain of 1 to 6 carbon atoms, and $R^8$ is a monovalent, linear or branched aliphatic hydrocarbon radical having in each case 1 to 12 carbon atoms or cycloaliphatic hydrocarbon radical having 6 to 12 carbon atoms, or a monovalent aromatic hydrocarbon radical having 6 to 12 carbon atoms, or a radical of the formula —C(=O)—$R^9$, where $R^9$ is a monovalent, linear or branched aliphatic hydrocarbon radical having in each case 1 to 12 carbon atoms or a cycloaliphatic hydrocarbon radical having 6 to 12 carbon atoms or a monovalent aromatic hydrocarbon radical having 6 to 12 carbon atoms. The selected silane or, where appropriate, the selected silanes, may be present in unhydrolyzed form, in hydrolyzed form, or in hydrolyzed and partially condensed or hydrolyzed and condensed form, or in a mixture of these forms.

Moreover, in the miniemulsion polymerization, there may optionally also be hydrophobic coemulsifiers present in amounts of up to 3 wt %, based on the total weight of component (A) and of functionalized component (B). In the present case, silicone resins may often take on the function of the coemulsifier. Further examples of coemulsifiers are hexadecane, cetyl alcohol, oligomeric cyclosiloxanes such as octamethylcyclotetrasiloxane, for example, or else vegetable oils such as rapeseed oil, sunflower oil or olive oil. Also suitable are organic or inorganic polymers having a number-average molecular weight Mn of less than 10,000.

Hydrophobic coemulsifiers particularly preferred in accordance with the invention are the silicone resins to be polymerized, themselves, and hexadecane.

The copolymers are prepared in a heterophase process by the known technique of miniemulsion polymerization. Miniemulsion polymerizations differ in a number of key points from emulsion polymerization. See the following in this regard: Dissertation "Non-aqueous emulsion polymerizations" presented by Kevin Müller, Mainz 2008, pp. 17-20, and references cited therein: In contrast to emulsion polymerization, where the size of the polymer latex particles is determined essentially by kinetic processes and the stability of the lattices, the basis for miniemulsion polymerization is that the monomer even before the polymerization is present completely within micelles and therefore need no longer diffuse from the monomer droplets into the micelles during the polymerization. In other words, therefore, the latex particles formed may be regarded as polymerized copies of the monomer droplets present at the start. A consequence of this is that the size of the latex particles is determined exclusively by the dispersion process and by the stability of the monomer-filled micelles. Since there is no need for transport of monomer through the continuous phase, it is possible in this way to enable the use also of monomers which are absolutely insoluble in the continuous phase. To increase the stability of the monomer droplets it is necessary to suppress Ostwald ripening that takes place. During the miniemulsion polymerization of the dispersed monomer phase, a hydrophobe or, in the case of inverse miniemulsions, a lipophobe is therefore added.

Among the species which may act as a hydrophobe, optionally, is a hydrophobic monomer suitable for the purpose, such as, for example, a silicone component.

The miniemulsion polymerization differs here from suspension polymerization in two respects: firstly, the resulting polymer particles in the miniemulsion process are much smaller (50-500 nm) than those of the suspension polymerization (1 μm-1 mm). Secondly, the number of radicals per growing particle in the suspension polymerization, at 10, is well above those of the miniemulsion polymerization, where, viewed statistically, there is 0.5 radical per growing particle during the reaction.

In order to carry out a radical miniemulsion polymerization it is first of all necessary to construct a miniemulsion of a vinyl monomer in a continuous phase which is not miscible with the monomer. For this purpose, the monomer, together with the emulsifier and the hydrophobe, is dispersed in water by input of energy, using, for example, a high-pressure homogenizer or by means of ultrasound. Here, the combination of emulsifier and hydrophobe retards the occurrence of Ostwald ripening and the coalescence of the monomer droplets. In the second stage, the monomer droplets formed in this way are polymerized. This may be triggered either by a water-soluble initiator, which is added after preparation of the stable miniemulsion, or by oil-soluble initiators, which may be present in the monomer phase right from the start, or by a combination of both.

The monomer droplets formed in the miniemulsion have, approximately, a size of 50-500 nm. This small size is a consequence of the homogenization of the miniemulsion, achieved through the input of high quantities of energy. The transfer of monomer between the individual droplets is suppressed by the specific type of stabilization.

Also, parallel to the small monomer droplets, there are no longer any free micelles present in the miniemulsion. In contrast to the conventional emulsion polymerization, therefore, it is primarily the droplets which are the locus of nucleation (droplet nucleation). During the miniemulsion polymerization, accordingly, there is also only extremely slight diffusion of the monomers observed. Within a miniemulsion polymerization, consequently, each dispersed monomer droplet may be described as an individual reactor operated at a nanoscopic level. As a consequence, a number of advantages result for this method, in contrast to the traditional emulsion and suspension polymerizations, and these advantages will be highlighted below:

Because the monomer does not have to be transported through the continuous, usually aqueous phase, it is possible in miniemulsions to polymerize even monomers that are absolutely insoluble in water.

The size of the latex particles usually corresponds to that of the monomer droplets formed beforehand, and can be adjusted with considerable precision via the nature and amount of the emulsifier used.

Each monomer droplet is homogeneous in its composition. Specifically for copolymerizations, therefore, the monomer ratio in each droplet is the same and is not subject to a difference in diffusion of the monomers.

The amounts of emulsifier used are smaller, since the miniemulsion is stabilized only kinetically, but not thermodynamically.

The step essential to the process, the step of preparing the finely divided miniemulsion, is executed in the present, inventive case as follows:

In the first step, one or more silicone resins composed of siloxane units of the formula (I) are dissolved in one or more ethylenically unsaturated monomers, giving a silicone resin-in-monomer solution. Characteristic here is the fact that the silicone resins composed of siloxane units of the formula (I) are soluble in the respective monomer mixture. Insoluble constituents are separated off, as and when appropriate, by filtration. The only silicone resin-in-monomer solutions that are in accordance with the invention are those containing no insoluble silicone constituents.

The silicone resin-in-monomer solution is optionally admixed with a hydrophobic coemulsifier. Examples of hydrophobic coemulsifiers are identified earlier on above.

In the second step, the silicone resin-in-monomer solution is emulsified with water and at least one emulsifier, and optionally with further auxiliaries, such as polymerization inhibitors which prevent the premature radical emulsion polymerization, in such a way, preferably with application of high shearing force, as to obtain emulsions having particle sizes D(50) of not more than 350 nm, known as miniemulsions. High shearing force in this context may be generated by means of suitable emulsifying equipment, such as conventional rotor-stator systems, or in other ways that are common knowledge, as for example by high-pressure homogenizers, dissolver disks, ultrasound devices or comparable emulsifying technologies allowing a high shearing force to be exerted that permits the generation of small particles of not more than 200 nm, giving miniemulsions having particle sizes D(50) of not more than 350 nm. In the case of commercial rotor-stator systems, rotary speeds of 4000-12,000 rpm, preferably 5000-11,000 rpm, more particularly 6000-10,000 rpm, have proven to be particularly advantageous. Both continuous and discontinuous embodiments are suitable. In the case of high-pressure homogenizers, pressures of preferably 300 bar-1000 bar, more preferably 350 bar-900 bar, and most preferably 400 bar-800 bar, have proven to be advantageous. Since the preparations are polymerizable, effective temperature monitoring is important; i.e., the temperatures of the miniemulsions are preferably not to exceed 60° C., more preferably 55° C., and most preferably 50° C., and in such an event are to be rapidly cooled back down below these temperatures.

Silicone resin-in-monomer solutions of the invention possess viscosities of 2-20,000 mPas at 25° C., preferably 5-15,000 mPas at 25° C., and most preferably 7-10,000 mPas at 25° C. The miniemulsions of the invention possess viscosities of 2-5000 mPas at 25° C., preferably 3-4500 mPas at 25° C., and most preferably 5-4000 mPas at 25° C.

The amount of water in the miniemulsons of the invention is 80-20 weight percent, preferably 75-20 weight percent, and most preferably 70-25 weight percent.

The particle size D(50) in the miniemulsions of the invention is not more than 350 nm, preferably not more than 300 nm, more preferably not more than 250 nm, and most preferably not more than 200 nm, and at least 20 nm, preferably at least 30 nm, and more preferably at least 50 nm.

The miniemulsions of the invention consist of a continuous water phase and a dispersed organic phase.

The organic phase of the miniemulsions is polymerized by the process of radical emulsion polymerization. In this case, in a third step, the dispersed silicone resin-in-monomer solution is subjected to free radical polymerization. This radical emulsion polymerization is preferably executed by metered addition of the miniemulsion to an initial charge comprising water and a portion of catalyst. Further metered feeds comprise the polymerization initiator, which may optionally encompass a plurality of components, each of which is separately metered in or included in the initial charge, according to their mutual interaction and function in the polymerization procedure. When miniemulsion polymerization has been completed, the resulting dispersion, where necessary, is adjusted for the desired pH, optionally filtered, and is then available for the respective use.

The reaction temperatures in the miniemulsion polymerization are preferably 0° C. to 100° C., more preferably 5° C. to 80° C., and most preferably 30° C. to 70° C.

The pH of the dispersing medium is between 2 and 9, preferably between 4 and 8. In one particularly preferred embodiment it is between 4.5 and 7.5. The pH can be adjusted before the start of the reaction by means of hydrochloric acid or aqueous sodium hydroxide solution. The polymerization may be carried out batchwise or continuously, with the inclusion of all or individual constituents of the reaction mixture in the initial charge, with individual constituents of the reaction mixture being included part in the initial charge and part metered in subsequently, or by the metering method without an initial charge. All metered feeds are made preferably at the rate at which the component in question is consumed.

The polymerization is initiated by means of the customary water-soluble initiators or redox-initiator combinations, preferably with the latter. Examples of initiators are the sodium, potassium, and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, and azobisisobutyronitrile. The stated initiators are preferably used in amounts of 0.01 to 4.0 wt %, based on the total weight of the monomers. As redox-initiator combinations, initiators identified above are used in conjunction with a reducing agent. Suitable reducing agents are sulfites and bisulfites of monovalent cations, an example being sodium sulfite, or the derivatives of sulfoxylic acid such as zinc or alkali metal formaldehydesulfoxylates, as for example sodium hydroxymethanesulfinate, and ascorbic acid. The amount of reducing agent is preferably 0.15 to 3 wt % of the monomer amount used. Additionally, small amounts of a metal compound which is soluble in the polymerization medium and whose metal component is redox-active under the polymerization conditions may be introduced, this compound being based for example on iron or vanadium. One particularly preferred initiator system comprising the aforementioned components is the system tert-butyl hydroperoxide/sodium hydroxymethanesulfinate/ $Fe(EDTA)^{2+/3+}$.

According to the miniemulsion polymerization methodology, it is also possible to use predominantly oil-soluble initiators, such as cumene hydroperoxide, isopropylbenzene monohydroperoxide, dibenzoyl peroxide or azobisisobutyronitrile. Preferred initiators for miniemulsion polymerizations are potassium persulfate, ammonium persulfate, azobisisobutyronitrile, and dibenzoyl peroxide.

The dimensions of the silicone domains within the copolymer after copolymerization has taken place are preferably in the range from 5 nm to 150 nm, more particularly from 10 nm to 140 nm, and most preferably from 15 nm to 125 nm. The dimensions may be determined, for example, by scanning electron microscopy or transmission electron microscopy on the polymer dispersions or on the polymer films obtained from them.

The copolymers of the invention in the form of their dispersions are preferably used as binders for producing coatings. They possess high storage stabilities. To coatings which use them as binders, they impart excellent resistance with respect, for example, to effects of weathering, attack by chemical effects, and UV radiation. With these coatings it is likewise possible to achieve very good water resistance and low soiling tendency. With copolymers adjusted hydrophobically, moreover, it is possible to realize porous coatings, having a pigment volume concentration above the critical pigment volume concentration, which are distinguished by excellent gas permeability and water vapor permeability in conjunction with high water repellency. The copolymerization of silanes containing hydrolysable and condensable groups into the copolymer allows binders to be produced which are moisture-curing after application, hence making it possible to set the film hardnesses, the thermoplasticity, and the soiling tendency.

As well as for this purpose, the copolymers of the invention in the form of their dispersions and redispersion powders can also be used as additives to preparations for coatings or other end uses, and without further adjuvants can be used as a pure material which forms films over substrates or which cures to form blocks or any other desired forms.

Examples of fields of application in which the copolymers of the invention in the form of their dispersions and redispersion powders allow the properties identified above to be manipulated are the production of coating materials and impregnating systems and, obtainable therefrom, coatings and coverings on substrates, such as metal, glass, wood, mineral substrate, synthetic and natural fibers for producing textiles, carpets, floor coverings, or other articles which can be produced from fibers, and also leather and plastics such as films and moldings. The copolymers of the invention can be incorporated in liquid form or in fully cured, solid form into elastomer compounds. In that context they can be used for the purpose of boosting or for enhancing other service properties, such as the control of transparency, of heat resistance, of the yellowing tendency, and of weathering resistance.

Depending on the application, one or more auxiliaries may optionally be added to the copolymers. Examples of such auxiliaries are solvents or film-forming assistants; mixtures of at least two organic solvents; pigment wetting agents and dispersants; additives imparting surface effects, such as, for example, those used to obtain textures such as a hammer finish or orange peel; antifoams; substrate wetting agents; surface leveling agents; adhesion promoters; release agents; further organic polymer, not identical with the organic polymer (A); surfactant; hydrophobic auxiliary; and a silicone resin which is not radically polymerizable.

Examples of auxiliaries which can be used for the construction coating materials of the invention are anionic, cationic, and ampholytic surfactants (C), pigments (D), and additives (F).

Particularly suitable anionic surfactants (C) are as follows:

1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.

2. Sulfonates, particularly alkylsulfonates having 8 to 18 carbon atoms, alkylarylsulfonates having 8 to 18 carbon atoms, taurides, esters and monoesters of sulfosuccinic acid with monohydric alcohols or alkylphenols having 4 to 15 carbon atoms; these alcohols or alkylphenols may optionally also be ethoxylated with 1 to 40 EO units.

3. Alkali metal and ammonium salts of carboxylic acids having 8 to 20 carbon atoms in the alkyl, aryl, alkaryl or aralkyl radical.

4. Partial esters of phosphoric acid and the alkali metal salts and ammonium salts of such esters, particularly alkyl and alkaryl phosphates having 8 to 20 carbon atoms in the organic radical, alkyl and alkaryl ether phosphates having 8 to 20 carbon atoms in the alkyl or alkaryl radical and 1 to 40 EO units.

Particularly suitable nonionic surfactants (C) are as follows:

5. Polyvinyl alcohol also having 5% to 50%, preferably 8% to 20% of vinyl acetate units, with a degree of polymerization of 500 to 3000.

6. Alkyl polyglycol ethers, preferably those having 8 to 40 EO units and alkyl radicals of 8 to 20 carbon atoms.

7. Alkylaryl polyglycol ethers, preferably those having 8 to 40 EO units and 8 to 20 carbon atoms in the alkyl and aryl radicals.

8. Ethylene oxide/propylene oxide (EO/PO) block copolymers, preferably those having 8 to 40 EO and/or PO units.

9. Adducts of alkylamines having alkyl radicals of 8 to 22 carbon atoms with ethylene oxide or propylene oxide.

10. Fatty acids having 6 to 24 carbon atoms.

11. Alkylpolyglycosides of the general formula R*—O-Zo, in which R* is a linear or branched, saturated or unsaturated alkyl radical having on average 8-24 carbon atoms and Zo is an oligoglycoside residue with on average o=1-10 hexose or pentose units or mixtures thereof.

12. Natural substances and derivatives thereof, such as lecithin, lanolin, saponins, cellulose; cellulose alkyl ethers and carboxyalkylcelluloses whose alkyl groups in each case possess up to 4 carbon atoms.

13. Linear organo(poly)siloxanes containing polar groups, especially those having alkoxy groups with up to 24 carbon atoms and/or up to 40 EO and/or PO groups.

Particularly suitable cationic surfactants (C) are as follows:

14. Salts of primary, secondary and tertiary fatty amines having 8 to 24 carbon atoms with acetic acid, sulfuric acid, hydrochloric acid, and phosphoric acids.

15. Quaternary alkylammonium and alkylbenzeneammonium salts, especially those whose alkyl groups possess 6 to 24 carbon atoms, more particularly the halides, sulfates, phosphates, and acetates.

16. Alkylpyridinium, alkylimidazolinium, and alkyloxazolinium salts, more particularly those whose alkyl chain possesses up to 18 carbon atoms, especially the halides, sulfates, phosphates, and acetates.

Particularly suitable ampholytic surfactants (C) are as follows:

17. Amino acids with long-chain substitution, such as N-alkyldi(aminoethyl)glycine or N-alkyl-2-aminopropionic salts.

18. Betaines, such as N-(3-acylamidopropyl)-N:N-dimethylammonium salts with a C8-C18 acyl radical, and alkylimidazolium betaines.

Examples of pigments (D) are earth pigments such as chalk, ocher, umber, green earth, mineral pigments such as titanium dioxide, chromium yellow, red lead oxide, zinc yellow, zinc green, cadmium red, cobalt blue, organic pigments such as sepia, Cassel brown, indigo, azo pigments, anthraquinonoid, indigoid, dioxazine, quinacridone, phthalocyanine, and isoindolinone pigments and alkali blue pigments.

The aqueous construction coating materials may further comprise additives (F). Examples of additives (F) are biocides, thickeners, alkyl orthotitanates, alkylboric esters, pigment wetting agents and dispersants, antifoams, anticorrosion pigments, further metal oxides not identical to the pigment (D) and not anticorrosion pigments, metal carbonates, and organic resins.

The silicone-resin-containing organocopolymer dispersions of the invention may be added during the process of producing the construction coating materials, during different operating steps. For example, they can be added to the millbase, in the manner typical for silicone resin binders, or they are added during the letdown process, in a manner more typical for dispersions of organic polymers.

The aqueous construction coating materials contain preferably 1 to 80 wt %, more preferably 4 to 70 wt %, and most preferably 5-60 wt %, of the silicone-resin-containing organocopolymer dispersions.

The aqueous construction coating materials preferably contain 0.1 to 10 wt %, more preferably 0.5 to 8 wt %, of surfactant (C).

The aqueous construction coating materials preferably contain 0.5 to 50 wt %, more preferably 2 to 45 wt %, and most preferably 5 to 40 wt %, of pigment (D).

The aqueous construction coating materials preferably contain 10 to 80 wt %, more preferably 15 to 75 wt %, and most preferably 20 to 65 wt %, of water (E).

The aqueous construction coating materials contain preferably 0.1 to 60 wt %, more preferably 1 to 50 wt %, more particularly 1 to 40 wt %, of additives (F).

The term "construction coating materials" covers coating materials, such as paints, stains, impregnating compositions or creams, intended not only for application directly on the building, both internally and externally, but also those which are applied to the appendices to buildings, such as outdoor facilities possibly in a wider sense—in other words, in the example of outdoor equipment, to such outdoor facilities as verandas, patios or outer railings, and to property borders or fence enclosures, including, for example, to pasture fences. Also included is the coating of building materials not yet used for building, such as bricks, lime-sand blocks or concrete blocks. Such coatings may be porous or film-forming. The most widespread substrates are of mineral type and wooden. In addition, for example, metals and plastics are possible substrates for use.

Other subjects of the invention are a method for treating building materials with a construction coating material which comprises the aqueous, silicone-resin-containing organocopolymer dispersions, and the use of the aqueous, silicone-resin-containing organocopolymer dispersions as construction coating materials or as a constituent in construction coating materials.

The functionalization of silicone resins S with olefinic groups allows the generation of supercrosslinking building blocks, which are able to function as polyfunctional monomers on copolymerization with ethylenically unsaturated compounds. The polymerization may be conducted in an aqueous medium by an emulsion polymerization, and leads to stable, hydrophobically modified copolymer dispersions. The polymers which result in this way, depending on degree of functionalization of the silicone resins, are hybrid polymers with slight to substantial crosslinking. These polymers are notable for the facts that the functionalized silicone resins are bonded to the organic polymer via at least one C—C bond in each case and that in comparison to systems which contain only linear units with low degrees of crosslinking, they additionally exhibit increased mechanical resistance.

In comparison to systems which crosslink only through formation of Si—O—Si bonds, the polymer fractions give the dispersions of the invention an enhanced environmental resistance and chemical resistance, with respect to strongly acidic or alkaline media, for example.

This resistance can be boosted further if through the additional presence of silanol groups and/or alkoxy groups, additional crosslinking between the silicone resin molecules by Si—O—Si bond formation takes place in addition to the linking of the silicone resin to the organic matrix via formation of Si—C bonds. Where alkoxysilyl functions and/or silanol functions are incorporated additionally into the polymer side chains through addition of radically polymerizable silanes, it is possible for there to be additional aftercrosslinking by formation of Si—O—Si bonds between silicone resins S and side chain or between side chain and side chain, as well.

A particular sign and an advantage of the silicone resin organocopolymer dispersions of the invention is that in dispersion form they are stable and that this aftercrosslinking does not take place during storage of the dispersion. That would be a disadvantage, since it would result in the formation of low molecular mass alcohols as elimination products, thereby reducing the storage stability of the dispersions, and which are also classed as volatile organic content (VOC), the presence of which is fundamentally undesirable. In order to increase this effect further it is preferred for the radicals $R^2$ in the siloxane units (I) to comprise at least 2 carbon atoms—in the most preferred embodiment, they possess precisely 2 carbon atoms, with the most preferred radical $R^2$ being the ethyl radical, so that the silicon-bonded alkoxy function is the ethoxy group.

The hydrolytic stability of the silicone resin organocopolymers of the invention can be seen in particular as an advantage for the gamma-silane-modified silicone resins (B) over the alpha-silane-modified silicone resins from U.S. Pat. No. 7,674,868 B2. The alkoxy groups of alpha-silanes are much more reactive than those of gamma-silanes and are therefore difficult to keep stable in an aqueous environment. Consequently, the alpha-silanes used in the examples in U.S. Pat. No. 7,674,868 B2 are also particularly low-alkoxy alpha-silanes, whose alkoxy groups are consumed as completely as possible during the reaction used to prepare the modified silicone resins.

Preparative Examples

In the present text, substances are characterized by reporting of data obtained by means of instrumental analysis. The underlying measurements are carried out either in accordance with publicly accessible standards or are determined using specially developed techniques. In order to ensure the clarity of the teaching imparted, the methods used are specified hereinbelow.

In all examples, all figures for parts and percentages are given by weight, unless otherwise indicated.

Viscosity:

The viscosities, unless otherwise indicated, are determined by measurement using rotational viscometry in accordance with DIN EN ISO 3219. Unless indicated otherwise, all viscosity figures are for 25° C. and atmospheric pressure of 1013 mbar.

Refractive Index:

The refractive indices are determined in the wavelength range of visible light, unless otherwise indicated at 589 nm at 25° C. and atmospheric pressure of 1013 mbar, in accordance with standard DIN 51423.

Transmission:

The transmission is determined by UV VIS spectroscopy. An example of a suitable instrument is the Analytik Jena Specord 200.

The measurement parameters used are: range: 190-1100 nm, step width: 0.2 nm, integration time: 0.04 s, measuring mode: step operation. First, the reference (background) is measured. A quartz plate secured to a sample holder (quartz plate dimensions: H×W about 6×7 cm, thickness about 2.3 mm) is placed in the sample beam path and measured with respect to air.

This is followed by sample measurement. A quartz plate secured to the sample holder and with the sample applied—layer thickness of applied sample about 1 mm—is placed in the sample beam path and measured with respect to air. Internal calculation against the background spectrum provides the transmission spectrum of the sample.

Molecular Compositions:

The molecular compositions are determined by nuclear magnetic resonance spectroscopy (regarding terminology see ASTM E 386: High-Resolution Nuclear Magnetic Resonance Spectroscopy (NMR): terms and symbols), with measurement of the $^1H$ nucleus and the $^{29}Si$ nucleus.

Description of $^1H$ NMR Measurement

Solvent: $CDCl_3$, 99.8% d

Sample concentration: about 50 mg/1 ml $CDCl_3$ in 5 mm NMR tubes

Measurement without addition of TMS, referencing of spectra with residual $CHCl_3$ in $CDCl_3$ at 7.24 ppm Spectrometer: Bruker Avance I 500 or Bruker Avance HD 500

Sample head: 5 mm BBO sample head or SMART sample head (from Bruker)

Measurement Parameters:

Pulprog=zg30
TD=64 k
NS=64 or 128 (depending on the sensitivity of the sample head)
SW=20.6 ppm
AQ=3.17 s
D1=5 s
SFO1=500.13 MHz
O1=6.175 ppm Processing Parameters:

SI=32 k
WDW=EM
LB=0.3 Hz

According to the type of spectrometer used, individual adjustments to the measurement parameters may be required.

Description of $^{29}Si$ NMR Measurement

Solvent: $C_6D_6$ 99.8% d/$CCl_4$ 1:1 v/v with 1 wt % $Cr(acac)_3$ as relaxation reagent Sample concentration: about 2 g/1.5 ml solvent in 10 mm NMR tubes Spectrometer: Bruker Avance 300

Sample head: 10 mm 1H/13C/15N/29Si glass-free QNP sample head (from Bruker)

Measurement Parameters:

Pulprog=zgig60
TD=64 k
NS=1024 (depending on the sensitivity of the sample head)
SW=200 ppm
AQ=2.75 s
D1=4 s
SFO1=300.13 MHz
O1=−50 ppm Processing Parameters:

SI=64 k
WDW=EM
LB=0.3 Hz

According to the type of spectrometer used, individual adjustments to the measurement parameters may be required.

Molecular Weight Distributions:

Molecular weight distributions are determined as the weight average Mw and the number average Mn, employing the method of gel permeation chromatography (GPC or size exclusion chromatography (SEC)) with polystyrene standard and a refractive index detector (RI detector). Unless specified otherwise, THF is used as the eluent and DIN 55672-1 is employed. The polydispersity is the quotient Mw/Mn.

Glass Transition Temperatures:

The glass transition temperature is determined by Differential Scanning calorimetry (DSC) according to DIN 53765, pierced crucible, heating rate 10 K/min.

Determination of the Particle Size:

The particle sizes were measured by the method of Dynamic Light Scattering (DLS) with determination of the zeta potential.

The accessories and reagents used for the determination were as follows:

Polystyrene cuvettes 10×10×45 mm, Pasteur pipettes for single use, ultrapure water.

The sample for measurement is homogenized and introduced bubble-free into the measuring cuvette.

Measurement takes place at 25° C. after an equilibration time of 300 s, with high resolution, with automatic adjustment of measuring time.

The values reported are always based on the D(50) value. D(50) is understood as the volume-averaged particle diameter, at which 50% of all particles measured have a volume-averaged diameter smaller than the identified value D(50).

Preferred Preparation Process for the Ethylenically Unsaturated Silicone Resins: Silane Modification of Alkoxy-Functional Silicone Resins.

Inventive Example 1: Batchwise Preparation of an
Ethylenically Unsaturated Silicone Resin (B) by
Cocondensation of an Ethoxy-Functional Silicone
Resin S with (trimethoxy)(propylmethacryloyloxy)
silane $(CH_3O)_3Si(CH_2)_3OC(=O)C(CH_3)=CH_2$ A 4 l four-neck flask equipped with a condenser, a distillation bridge, thermometer and stirrer is charged with 900 g of ethanol, 186 g of fully demineralized water, 3.48 g of 20% strength aqueous hydrochloric acid, 202.3 g of phenyltriethoxy-silane and 77.1 g of (trimethoxy) (propyl-methacryloyloxy)silane and these ingredients are mixed. Added to this mixture with stirring over the course of 10 minutes are 1080 g of a silicone resin consisting of 98 mol % of $MeSiO_{3/2}$ units (=T units) and 2 mol % of $Me_2SiO_{2/2}$ units (=D units), with 36 wt % of EtO radicals distributed statistically over the T units, this resin possessing a molecular weight Mw of 2560 g/mol and a viscosity of 25 mPas at 25° C.

The mixture is subsequently heated to 79° C. over the course of 28 minutes, producing a reflux of ethanol. Stirring is continued at this temperature for 15 minutes, followed by neutralization by addition of 53.4 g of a solution prepared by mixing 3.4 g of 30% strength sodium methoxide solution in methanol and 50 g of ethanol. The resulting solution is freed from all volatile constituents by distillation at 10 mbar and 80° C. This gives 930 g of a solid silicone resin (B) slightly tacky at 25° C. and having the following properties:
Molecular Weight and Nonuniformity:
Mw=5400 g/mol
Mn=2160 g/mol
PD=2.5
Molecular Composition from $^1$H NMR and $^{29}$Si NMR:
$PhSiO_{3/2}+MeSiO_{3/2}+((CH_2)_3OC(=O)C(CH_3)=CH_2)SiO_{3/2}$: 64.65 mol %
$PhSi(OEt)O_{3/2}$: 4.8 mol %
$Me/((CH_2)_3OC(=O)C(CH_3)=CH_2)Si(OEt/OMe)O_{2/2}$: 29.7 mol %
$Me/((CH_2)_3OC(=O)C(CH_3)=CH_2)Si(OEt/OMe)_2O_{1/2}$: 0.85 mol %
Ethoxy content: 17.7 wt %
1.4 wt % of silicon-bonded OH groups
0.1 wt % of Si-bonded MeO groups
5.16 wt % of Si-bonded EtO groups
5.75 wt % of Si-bonded $((CH_2)_3OC(=O)C(CH_3)=CH_2)$ groups Comparative Example 1: Preparation of a
Noninventive Alpha-Silane-Modified Olefinically
Unsaturated Silicone Resin In accordance with the procedure of inventive example 1, a noninventive silicone resin is prepared using the alpha-silane (trimethoxy)(methylmethacryloyloxy)silane $(CH_3O)_3Si(CH_2)OC(=O)C(CH_3)=CH_2$ instead of the gamma-silane (trimethoxy) (propylmethacryloyloxy)silane $(CH_3O)_3S(CH_2)_3OC(=O)C(CH_3)=CH_2$.

The procedure is otherwise the same.

This gives 903 g of a solid silicone resin which is Blighty tacky at 25° C. and has the following properties:
Molecular Weight and Nonuniformity:
Mw=4500 g/mol
Mn=2060 g/mol
PD=2.2
Molecular Composition from $^1$H NMR and $^{29}$Si NMR:
$PhSiO_{3/2}+MeSiO_{3/2}+((CH_2)OC(=O)C(CH_3)=CH_2)SiO_{3/2}$: 65.18 mol %
$PhSi(OEt)O_{3/2}$: 4.5 mol %
$Me/((CH_2)OC(=O)C(CH_3)=CH_2)Si(OEt/OMe)O_{2/2}$: 29.54 mol %
$Me/((CH_2)OC(=O)C(CH_3)=CH_2)Si(OEt/OMe)_2O_{1/2}$: 0.78 mol %
Ethoxy content: 16.5 wt %
1.3 wt % of silicon-bonded OH groups
0.1 wt % of Si-bonded MeO groups
4.96 wt % of Si-bonded EtO groups
5.68 wt % of Si-bonded $((CH_2)OC(=O)C(CH_3)=CH_2)$ groups Inventive Example 2: Continuous Preparation of an
Ethylenically Unsaturated Silicone Resin (B) by
Cocondensation of an Ethoxy-Functional Silicone
Resin S with (trimethoxy)(propyl-methacryloyloxy)
silane $(CH_3O)_3Si(CH_2)_3OC(=O)C(CH_3)=CH_2$ The apparatus used is a continuous alkoxylation unit, consisting of a preliminary loop reactor (step 1) having a capacity of 2 l and a circulation evaporator 2.5 l in size and fitted with a reaction column 5 m long and having an inside width of 50 mm (step 2), in which the chlorosilanes used as raw materials are alkoxylated, followed by a loop reactor (step 3) having a capacity of 1.5 l, in which the cocondensation of the silicone resin, obtainable from the column step, with the methacrylate-functional silane is carried out.

The preliminary reactor is charged with 1500 g of a mixture of 150 g of isooctyltrichlorosilane and 1350 g of methyltrichlorosilane.

The circulation evaporator is filled with 2000 g of ethanol and set to a liquid phase temperature of 78° C. (ethanol reflux). The reaction loop of 1.5 liter capacity is filled with a mixture consisting of equal parts by weight of the alkoxyoligomeric polyorganosiloxane obtainable from steps 1 and 2, and ethanol, and this mixture is heated to 60° C. while being pumped in circulation.

The chlorosilane mixture in the preliminary reactor is pumped in circulation and 500 g of ethanol are metered in. The metered feed to the preliminary reactor is subsequently set so as to add 1500 g/h of a mixture consisting of 1 part of isooctyltrichlorosilane and 9 parts of methyltrichlorosilane, and also 500 g/h of ethanol, at a constant rate.

In the preliminary reactor, the chlorosilane mixture undergoes partial alkoxylation, with the HCl obtained as a by-product of the reaction escaping via an off-gas line.

After the preliminary reactor, the reaction mixture is applied to the top third of the reaction column. The reaction system is supplied additionally with 500 g/h of ethanol and 140 g/h of water via the liquid phase of the reaction column, and is heated at reflux (ethanol BPT: 78° C.)

The partial alkoxylate coming from the preliminary reactor is consumed by reaction with countercurrent ethanol to form the alkylsilane trialkoxylate, which is condensed to the oligomer in the liquid phase of the reaction column by the water. The degree of oligomerization or polymerization can be controlled via the amount of water used.

The overhead distillate produced in the reaction column is condensed and returned to the column a short way below the point at which the reaction mixture from the preliminary reactor is fed in. It is not fed into the liquid phase of the reaction column or to any location in the column which is closer to the liquid phase than the metering point indicated. This is done in order to prevent an excessive amount of acid reflux entering the liquid phase and making the condensation reaction there uncontrollable.

Accordingly, the HCl liberated in the process is taken off completely from the reaction system via the off-gas line, with the consequence that the silicone resin intermediate as it is so-called here, which can be taken from the liquid phase of the reaction column, is obtained, without further workup, with a residual HCl content of less than 100 ppm (can be titrated). The silicone resin intermediate prepared accordingly in the liquid phase of the reaction columns can if desired be taken from the liquid phase of the reaction column and subjected to analytical characterization. It is notable for low viscosity (<100 mm$^2$/s) and also for high residual alkoxy contents of >20 wt %.

In a typical example, the following analytical data were obtained for the silicone resin intermediate:
Molecular Composition from $^{29}$Si NMR:
MeSiO$_{3/2}$+$^i$OctSiO$_{3/2}$: 12.6 mol %
MeSi(OEt)O$_{2/2}$+$^i$OctSi(OEt)O$_{3/2}$: 51.4 mol %
MeSi(OMe)$_2$O$_{1/2}$+$^i$OctSi(OEt)$_2$O$_{3/2}$: 29.3 mol %
MeSi(OMe)$_3$+$^i$OctSi(OEt)$_3$: 5.49 mol %
Me$_2$SiO$_{2/2}$: 0.91 mol % (owing to small amounts of dimethyldichlorosilane in methyltrichlorosilane)
Me$_2$Si(OEt)O$_{1/2}$: 0.3 mol % (owing to small amounts of dimethyldichlorosilane in methyltrichlorosilane)
Ethoxy content: 36.6 wt %
$^i$OctSi(OEt)$_{0-3}$O$_{3-0/2}$ content: 8.9 wt %
Mw: 1600 g/mol
Mn: 800 g/mol
PD: 2.0

At the rate at which it is formed, the reaction product from the liquid phase of the reaction column is introduced into the reaction loop. This reaction product from the liquid phase of the column consists of a mixture of equal parts of ethanol and silicone resin intermediate, as used for the charging of the reaction loop. The average feed rate for this 50% mixture here is 1200 g/h.

Additionally, at a further metering point, 36 g/h of (trimethoxy) (propylmethacryloyloxy)silane are metered in continuously.

Metered in to this initial charge in the reaction loop are 50 g of 1.3 wt % strength aqueous hydrochloric acid, in order to start the cocondensation reaction.

The silicone resin intermediate from the liquid phase of the reaction column is subsequently supplied to the reaction loop, with dilute hydrochloric acid (200 g/h of 1.3 wt % strength aqueous HCl) and the (trimethoxy) (propylmethacryloyloxy)silane, at the same rate as condensed end product is withdrawn from the reaction loop.

The reactant flow rates here are made such as to establish an average residence time of 15 minutes and also a solids content (dissolved resin in alcohol) of 35-40%.

The resulting condensed loop end product containing HCl acid is neutralized using a 30% strength solution of sodium methoxide in methanol, and then filtered.

Thereafter the alcoholic solution of end product is distilled, and a liquid end product is obtained which is defined by product parameters such as viscosity, residual alkoxy content, and molecular weight distribution. In a typical example, the following analytical data were obtained:
Molecular composition from $^1$H NMR and $^{29}$Si NMR:
MeSiO$_{3/2}$+$^i$OctSiO$_{3/2}$+((CH$_2$)$_3$OC(=O)C(CH$_3$)=CH$_2$)SiO$_{3/2}$: 53.6 mol %
MeSi(OEt)O$_{2/2}$+$^i$OctSi(OEt)O$_{2/2}$+((CH$_2$)$_3$OC(CH$_3$)=CH$_2$)Si(OMe)O$_{2/2}$: 40.6 mol %
MeSi(OEt)$_2$O$_{1/2}$+$^i$OctSi(OEt)$_2$O$_{1/2}$+((CH$_2$)$_3$OC(=O)C(CH$_3$)=CH$_2$)Si(OMe)$_2$O$_{2/2}$: 5.0 mol %
Me$_2$SiO$_{2/2}$: 0.80 mol % (owing to small amounts of dimethyldichlorosilane in methyltrichlorosilane)
Ethoxy content: 7.3 wt %
Methoxy content: 0.12 wt %
Silanol content (=Si—OH): 4.14 wt %
Isooctyl fraction: 11.9 wt %
5.51 wt % of Si-bonded ((CH$_2$)$_3$OC(=O)C(CH$_3$)=CH$_2$) groups
Further Product Parameters:
Viscosity: 3800 mm$^2$/s
Mw: 1900 g/mol
Mn: 600 g/mol
PD: 3.2

Inventive Example 3: Batchwise Preparation of an Ethylenically Unsaturated Silicone Resin (B) by Cocondensation of an Ethoxy-Functional Silicone Resin S with (trimethoxy)(propylmethacryloyloxy) silane (CH$_3$O)$_3$Si(CH$_2$)$_3$OC(=O)C(CH$_3$)=CH$_2$ In a 4 l four-neck flask equipped with a condenser, a distillation bridge, thermometer and stirrer, 720 g of tetraethyl silicate oligomer having an average degree of oligomerization of 9 are mixed with 292.80 g of hexamethyldisiloxane, 48 g of (trimethoxy)(propyl-methacryloyloxy) silane and 250.56 g of a low-viscosity, OH-terminated polydimethylsiloxane having on average 45 siloxane units at 23° C. Added rapidly to this initial charge are first 176.00 g of fully demineralized water and then 1.28 g of 25% strength aqueous hydrochloric acid. The mixture is heated to 60° C. At this temperature, the reaction sets in exothermically and heats itself automatically to 75° C. Heating is continued up to 79° C., and the system is maintained at reflux at this temperature for 1 hour. It is then cooled to 50° C., vacuum is slowly applied, and 300 g of ethanol are removed by distillation. 0.8 g of 25% strength aqueous NaOH solution is added to the product mixture obtained, to set a residual HCl content of 5-20 ppm. Subsequently 320 g of butyl acrylate are added, 100 g of Dicalite 4258 filter aid (supplier: Dicalite Europe, Belgium) are added, and filtration takes place through a Seitz K 100 filter plate. Added to the filtrate is 0.32 g of EETHANOX 4703 (=2,6-di-tert-butyl-alpha-dimethylamino-p-cresol, supplier: AlbemarleEurope SPRL, Belgium), and then all of the volatile constituents are removed by distillation at 60° C. and 20 mbar. This gives 992 g of a clear silicone resin solution in butyl acrylate, consisting of 39.3 wt % of butyl acrylate and 60.7 wt % of silicone resin.

The composition of the silicone resin according to $^1$H NMR and $^{29}$Si NMR is as follows:
Me$_3$SiO$_{1/2}$: 29.8 mol %
Me$_2$SiO$_{2/2}$: 25.5 mol %
Me/((CH$_2$)$_3$OC(=O)C(CH$_3$)=CH$_2$)SiO$_{3/2}$: 0.4 mol %
Me/((CH$_2$)$_3$OC(=O)C(CH$_3$)=CH$_2$)SiO$_{3/2}$: 1.1 mol %
Si(OEt/OMe)$_2$O$_{4/2}$: 1.6 mol %
Si(OEt/OMe)O$_{4/2}$: 17.7 mol %
SiO$_{4/2}$: 23.9 mol %
EtO-Si: 1.97 wt %
MeO—Si: 0.03 wt %
Si—OH: 1.4 wt %
Molecular Weight and Nonuniformity:
Mw=4050 g/mol
Mn=1450 g/mol
PD=2.8

Inventive Example 4: Preparation of Miniemulsions from the Silicone Resins from Inventive Example 1 and Inventive Example 2

The miniemulsion is produced by dissolving the respective silicone resin in the mixture of the monomers corresponding to the composition of the subsequent organic polymer fraction, followed by homogenization. For the homogenization it is possible to employ known homogenizing methods such as dispersing using dissolvers, Turrax mixer or high-pressure homogenizers. The objective of the homogenizing procedure is always to obtain a particle size of D(50)≤200 nm. The dispersing techniques suitable vary according to the composition of the preparation. Here, for illustration, examples were selected which use a standard laboratory Turrax mixer as the dispersing assembly.

Preparation of the Acrylate and Methacrylate Monomer Mixture

The following monomers are mixed in the stated ratio in a vessel with stirrer:

| | |
|---|---|
| Butyl acrylate (BA) | 750 g |
| Methyl methacrylate (MMA) | 505 g |
| Butyl methacrylate (BMA) | 221 g |
| Styrene | 126 g |
| Methacrylic acid (MAA) | 35 g |
| Total: | 1637 g |

Preparation of the Blend with the Silicone Resin:

| | |
|---|---|
| 195 g | silicone resin as per inventive example 1 or 2 |
| 455 g | (meth)acrylate mixture as indicated above |
| 650 g | total | are mixed with one another in a stirrable vessel.

The product is a (meth)acrylate monomer silicone resin solution containing 30 wt % silicone resin.

Production of the Miniemulsion on the Turrax Mixer:

| | | |
|---|---|---|
| 1. | IT 16 = polyoxyethylene (16) isotridecyl ether (nonionic emulsifier, manufacturer Cognis GmbH, Illertissen) | 62.6 g |
| 2. | (Meth)acrylate mixture with silicone resin as indicated above | 650 g |
| 3. | Hexadecane | 4.44 g |
| 4. | HQME (4-methoxyphenol) | 3.0 g |
| 5. | FD-H2O (fully demineralized water) | 391.8 g |
| | Total | 1101.8 g |

Procedure:

The constituents of the preparation for the emulsion are mixed in a suitable vessel and dispersed on the Turrax mixer at 8000 rpm for 10 minutes.

Using silicone resin from inventive example 1, this procedure gives a miniemulsion having a particle size of D(50)=197 nm.

Using silicone resin from inventive example 2, this procedure gives a miniemulsion having a particle size of D(50)=189 nm.

In both cases the miniemulsions have the target D(50) 200 nm.

Comparative Example 2: Production of a Noninventive Miniemulsion Containing the Silicone Resin from Comparative Example 1

In accordance with the procedure of inventive example 4, a miniemulsion is produced using the noninventive silicone resin from comparative example 1.

This gives a miniemulsion having a particle size of D(50)=193 nm.

A sample of the miniemulsion containing the resin from inventive example 1 and a sample of the miniemulsion containing the resin from comparative example 1 are each left to stand at room temperature of on average 22° C. for 2 weeks. After 2 weeks, the miniemulsion containing the resin from inventive example 1 is unchanged. In the sample containing the miniemulsion from comparative example 1, a sediment has formed; this sediment, although it can be shaken up, nevertheless quickly reforms. The sedimenting fraction of the miniemulsion containing the resin from comparative example 1 is isolated on a 100 μm filter plate and an attempt is made to dissolve it in acetone. The result is a turbid mixture, thus indicating that the precipitate formed is a crosslinked product which is no longer soluble. This phenomenon is attributable to the crosslinking tendency of the alkoxy groups which are bonded on the silicon atoms introduced by the alpha-silanes. They undergo hydrolysis in an aqueous preparation to form, by irreversible condensation, insoluble products which cannot be used for any application in coating materials. By comparison with this, the storability of the miniemulsion containing the resin from inventive example 1 is valid over the period of testing. After 4 weeks at room temperature of on average 22° C., the miniemulsion containing the resin from inventive example 1 was still unchanged.

Inventive Example 5: Copolymerization by the Method of Miniemulsion Polymerization In a 1000 ml polymerization vessel with anchor stirrer,
0.12 g of ethylenediaminetetraacetate (EDTA), disodium salt,
0.12 g of iron(II) ammonium sulfate hexahydrate,
92.4 g of fully demineralized water, and
83.5 g of the miniemulsion from inventive example 4 containing the silicone resin from inventive example 1 were mixed (=inventive example 5a) and heated to 50° C. (initial charge). The procedure with the miniemulsion from inventive example 4 containing the silicone resin from inventive example 2 (=inventive example 5b) is identical to this.

In a first vessel (feed 1a), a 10 wt % strength solution of tert-butyl hydroperoxide (TBHP) in water was prepared.

In a second vessel (feed 1b), a 5 wt % strength solution of sodium hydroxymethanesulfinate (Brüggolite) in water was prepared.

Into a third vessel (feed 2) 660 g of the above-described miniemulsion containing the silicone resin from inventive example 1 were introduced. Using the miniemulsion containing the silicone resin from inventive example 2, the procedure is identical.

The feed rates are set as follows:

Feeds 1a and 1b were commenced with a feed rate of 105 μl/min and the initial charge was polymerized at 50° C. for 20 minutes. Then feed 2 was commenced with a feed rate of 4 ml/min and the monomer emulsion was metered in continuously over 165 minutes. After the end of the feed (feed 2), the TBHP and Brüggolite feeds were continued for a further hour. The mixture was then cooled to room temperature and adjusted to a pH of 8 by addition of aqueous ammonia.

Dispersion Analysis:

Solids content: 49.1%, viscosity: 38 mPas; glass transition temperature $T_g$: 4° C. for silicone resin 1 and 0° C. for silicone resin 2;

Dynamic Light Scattering method: average particle size D(50): 189 nm for silicone resin 1 and 176 nm for silicone resin 2; filming of the polymer: after drying through evaporation of the water: smear-free soft film, no exudation of silicone; dispersion film has elastic properties.

TEM micrographs (ultramicrotome sections) of the film show a homogeneous distribution of the silicone in the matrix with silicone domains in the orders of magnitude of 50-120 nm.

In each case only one glass transition temperature is observed, not, separately, the individual glass transition temperature of the organic polymer and that of the silicone resin. This shows that this is a true copolymer, and more specifically a random copolymer.

This demonstrates two things. Firstly, the preparation of copolymers of this kind works, in contrast to what is taught in this regard by the prior art, with gamma-silane-modified silicone resins, with comparative example 2 showing that the miniemulsions containing gamma-silane-modified silicone resins are stable on storage, in contrast to alpha-silane-modified silicone resins, and do not compel the freshly prepared miniemulsions to be reacted immediately further to give the polymer dispersion. Accordingly, the miniemulsions of the invention are robust in their handling and have everyday suitability for regular production.

Secondly, these are not graft copolymers, but rather random copolymers. In the case of a graft copolymer in accordance with U.S. Pat. No. 5,618,879, the properties observed are generally not averaged properties, but are instead the properties of the two polymer fractions which have persisted individually.

Comparative Example 3: Noninventive Polymer Dispersion Containing the Noninventive Silicone Resin of Comparative Example 1, and Comparison of Storage Stability with an Inventive Polymer Dispersion In accordance with the procedure from inventive example 5, a polymer dispersion is prepared from a freshly prepared miniemulsion of comparative example 2 containing the silicone resin from comparative example 1.
Dispersion Analysis:
Solids content: 48.3%, viscosity: 34 mPas; glass transition temperature $T_g$: 3.4° C.
Dynamic Light Scattering method: average particle size D(50): 180 nm;
filming of the polymer: after drying by evaporation of the water: smear-free soft film, no exudation of silicone; dispersion film has elastic properties.

TEM micrographs (ultramicrotome sections) of the film show a homogeneous distribution of the silicone in the matrix with silicone domains in the orders of magnitude of 50-120 nm.

The polymer dispersion from comparative example 3, containing the noninventive, alpha-silane-modified silicone resin of comparative example 1, and the polymer dispersion from inventive example 5, containing the inventive, gamma-silane-modified silicone resin from inventive example 1, are stored in a drying cabinet at 50° C. for 8 weeks. After this time, the polymer dispersion containing the gamma-silane-modified silicone resin from inventive example 1 is unchanged. A storage time of 6-12 months at room temperature of on average about 22° C. would therefore be anticipated. After 1 week of storage at 50° C., the polymer dispersion of comparative example 3, containing the noninventive, alpha-silane-modified silicone resin of comparative example 1, formed a slight sediment which could no longer be reagitated and which increases steadily over the course of the second and third weeks of storage. Moreover, pronounced liquid-phase formation is formed; in other words, the dispersion has separated and the active ingredient it contains has crosslinked and precipitated as a sediment, with a separated aqueous phase above it. With such a short storage life, a product of this kind has no real utility value. In the case of global supply, the product, depending on the transportation distance, would under certain circumstances not even last for the supply time, encompassing the transportation and the execution of the necessary statutory formalities, even if chilled transport were ensured.

Inventive Example 6: Production of a Miniemulsion from the Silicone Resin from Inventive Example 3

The following components are placed into a stirrable vessel and mixed:

| | |
|---|---|
| 11.49 g | hexadecane |
| 632.10 g | butyl acrylate |
| 461.40 g | MMA (methyl methacrylate) |
| 201.90 g | BMA (butyl methacrylate) |
| 114.90 g | styrene |
| 269.40 g | silicone resin solution in butyl acrylate from inventive example 3 |

Tipped in succession into the stirred mixture are the following ingredients:

| | |
|---|---|
| 1217.40 g | fully demineralized water |
| 7.89 g | HQME (4-methoxyphenol) |
| 31.80 g | methacrylic acid |
| 51.60 g | SDS (sodium dodecyl sulfate) |

Procedure:
The initial emulsion obtained in this way is homogenized under a pressure of 800-900 bar using a high-pressure homogenizer having media-resistant valves.
This gives an emulsion having a particle size of D(50) =173 nm.

Inventive Example 7: Copolymerization by the Method of Miniemulsion Polymerization The procedure and feed quantities correspond exactly to those reported in inventive example 5, with the difference that the miniemulsion of inventive example 6 is used.
Dispersion Analysis:
Solids content: 43.1%, viscosity: 29 mPas; glass transition temperature $T_g$: 6° C.;
Dynamic Light Scattering method: average particle size D(50): 109 nm;
filming of the polymer: after drying through evaporation of the water: smear-free soft, tack-free film, no exudation of silicone; dispersion film has elastic properties.

TEM micrographs (ultramicrotome sections) of the film show a homogeneous distribution of the silicone in the matrix with silicone domains in the orders of magnitude of 50-90 nm.

Only one glass transition temperature is observed, not, separately, the individual glass transition temperature of the organic polymer and that of the silicone resin. This suggests that this is a true random copolymer. If two separate phases were present, both glass transition temperatures would be observed separately. The same is true of a graft copolymer in accordance with U.S. Pat. No. 5,618,879. With such copolymers, generally, the properties observed are likewise not average properties, but instead the properties of the two polymer fractions which have persisted individually.

Inventive Example 8: Inventive Architectural Preservative Coating Material Comprising the Dispersion of Inventive Example 5b The silicone-resin-containing organocopolymer dispersion used in this example was that of inventive example 5b (containing the silicone resin from inventive example 2).

Two architectural preservative coating materials having different binder contents and hence different pigment volume concentrations (PVC) were produced (see table 1).

Mixing took place in a commercial high-speed stirring mechanism for producing aqueous architectural preservative coatings.

Formulation 1 produces a porous coating, since its pigment volume concentration (PVC) is above the critical PVC. Formulation 2 produces an impervious film.

TABLE 1

Architectural preservative coating materials

| Component | Name (manufacturer, supplier) | Formulation 1 21.2% binder dispersion (high PVC) Amounts in g | 2 35.7% binder dispersion (low PVC) |
|---|---|---|---|
| Water | | 296 | 176 |
| In-can preservative | Acticide MBS (Thor) | 2.0 | 2.0 |
| Film preservative | Acticide MKB 3 (Thor) | 10.0 | 10.0 |
| Cellulose thickener | Tylose MH 30000 (Shin Etsu) | 3.0 | 3.0 |
| PU thickener | Tafigel PUR 40 (Münzing) | 2.0 | 2.0 |
| Polyphosphate, sodium salt | Calgon N (BK Giuline) | 2.0 | 2.0 |
| Polyacrylate, sodium salt | Lopon 890 (BK Giuline) | 2.0 | 2.0 |
| Silicone antifoam | SILFOAM SD 860 (Wacker Chemie AG) | 3.0 | 3.0 |
| Titanium dioxide pigment | Kronos 2190 (KRONOS) | 120.0 | 120.0 |
| Silicatic filler (aluminosilicate) | OpTiMat 2550, (Lehmann & Voss) | 12.0 | 12.0 |
| Talc (talc chlorite dolomite) | Steopac (Luzenac) | 40.0 | 40.0 |
| Calcium carbonate | Omyacarb 5 GU, (Omya) | 215.0 | 215.0 |
| Mica (mica quartz chlorite) | Plastorit 000, (Luzenac) | 80.0 | 80.0 |
| Aqueous sodium hydroxide solution, 10% | | 1.0 | 1.0 |
| Inventive aqueous silicone resin preparation from inventive example 5b | Inventive example 5b | 212 | 372 |
| Total: | | 1000 | 1040 |

Architectural preservative coating materials 1 and 2 are tested for their service properties in accordance with standard protocols below in table 2:

TABLE 2

Standard protocols

| | Test standard |
|---|---|
| Water permeability rate (w24 in kg/m²h0.5) | ISO 1062-3 |
| Scrub resistance after conditioning: storage for 4 d under standard conditions of 23° C. and 50% relative humidity | Measurement according to DIN 53778-2 |
| Scrub resistance after 200 h QUV-B weathering | Measurement according to DIN 53778-2 |
| Surface hydrophobicity through beading effect | In-house testing protocol |

Procedure for determining the surface hydrophobicity: One drop of water (volume 1 ml) is applied from a pipette to the surface under test. After 10 minutes, visual examination evaluates how effectively the drop wets the surface.
Evaluation System:
1=the water drop beads off completely and without residue from an inclined surface (slope 30° relative to the plane).
2=good beading effect but individual water droplets remain hanging on the surface.
3=the water drop beads off incompletely from an inclined surface (slope 30° relative to the plane).
4=the water drop no longer beads off from an inclined surface (slope 30° relative to the plane).
5=the water drop spreads on an inclined surface (slope 30° relative to the plane).

The following results are obtained, and are summarized in table 3:

TABLE 3

Results

| | 1 | 2 |
|---|---|---|
| $W_{24}$ in kg/m²h$^{0.5}$ | 0.08 | 0.03 |
| Scrub resistance after conditioning | >10,000 | >10,000 |
| Scrub resistance after QUV-B | >10,000 | >10,000 |
| Surface hydrophobicity | 4 | 4 |

Construction coatings obtained with both formulations not only block the passage of water very effectively, but also form a fairly hydrophilic surface.

Moreover, a very good mechanical result is achieved. The scrub resistance of the paints is at the highest level defined by the standard specified. This level is retained after weathering.

From storage-stable polymer dispersions, coatings are obtained that are not only film-forming but also porous, with high performance and in particular the special effect of a combination of hydrophilic surface, causing water to spread, and hydrophobic internal phase of the film, resulting in effective water retention. This is achieved with application of only one kind of coating material.

Inventive Example 9: Formulations of Architectural Preservative Coating Materials for Application to Wood Substrates (High-Build Woodstains)

The preparations indicated in table 4 below for producing high-build woodstains were prepared by mixing the preparation components using a commercial high-speed stirring assembly.

The formulation identified as "Control" contains no inventive copolymer dispersion and is therefore not in accordance with the invention. In the use examples below, it serves as comparator to the formulations A-D, which do contain inventive copolymer dispersions.

TABLE 4

High-build woodstains

| Component | Name (manufacturer) | Control [g] | A [g] | B [g] | C [g] | D [g] |
|---|---|---|---|---|---|---|
| Polyacrylate dispersion | Avanse ™ ST-410 (Dow Chemical) | 138.89 | | | 125.00 | 125.00 |
| Inventive copolymer-dispersion of inventive example 7 | Inventive example 7 | | 138.89 | | 13.89 | |
| Inventive copolymer-dispersion of inventive example 5b | Inventive example 5b | | | 138.89 | | 13.89 |
| Fully demineralized water | | 61.50 | 61.50 | 61.50 | 61.50 | 61.50 |
| Silicone antifoam | TEGO ® Foamex 805 (Evonik Industries) | 2.45 | 2.45 | 2.45 | 2.45 | 2.45 |
| Nonionic wetting agent | Surfynol ® 104DPM (Air Products) | 0.61 | 0.61 | 0.61 | 0.61 | 0.61 |
| Propylene glycol | | 3.79 | 3.79 | 3.79 | 3.79 | 3.79 |
| Microbicide | ROZONE ™2000 (Dow Chemical) | 1.60 | 1.60 | 1.60 | 1.60 | 1.60 |
| UV absorber | Ciba ® Tinuvin ® 1130 (Ciba) | 1.43 | 1.43 | 1.43 | 1.43 | 1.43 |
| UV absorber | Ciba ® Tinuvin ® 292 (Ciba) | 0.61 | 0.61 | 0.61 | 0.61 | 0.61 |
| Pigment concentrate | TINT-AYD ® CW-5600 red (Elementis Specialties) | 0.87 | 0.87 | 0.87 | 0.87 | 0.87 |
| Pigment concentrate | TINT-AYD ® CW-5499 yellow (Elementis Specialties) | 1.89 | 1.89 | 1.89 | 1.89 | 1.89 |
| Fully demineralized water | #2 Water, DI | 34.18 | 34.18 | 34.18 | 34.18 | 34.18 |
| PU thickener | ACRYSOL ™ RM-8W (Dow Chemical) | 2.18 | 2.18 | 2.18 | 2.18 | 2.18 |
| | Total: | 250.00 | 250.00 | 250.00 | 250.00 | 250.00 |

The water permeability of the formulations reproduced above was tested on a comparative basis, using the test method according to ASTM D4446/D4446M-13. The water permeability here is reported in percentage swelling according to the following equation:

$$\% \text{ swelling} = 100 \times \frac{\text{Swelling of untreated panel} - \text{swelling of treated panel}}{\text{Swelling of untreated panel}}$$

In other words, the greater the figure obtained, the greater the water retention capacity. For good performance, the standard requires a value of >60%.

Results obtained were as follows and are summarized in table 5:

TABLE 5

| | Results |
|---|---|
| Test formulation | Result to ASTM D4446/D4446M-13 |
| Control | 24.5 |
| A | 65.2 |
| B | 75.3 |
| C | 68.5 |
| D | 69.7 |

All formulations produced using an inventive copolymer dispersion exceed the water retention value required by the standard.

This shows that, not only on a mineral substrate but also on wood, highly performing coatings are obtained, and so the full desired universality is achieved.

The invention claimed is:

1. A composition comprising an aqueous dispersion comprising copolymers of ethylenically unsaturated monomers and of ethylenically functionalized silicone resins, prepared by means of radically initiated miniemulsion polymerization in aqueous medium of
(A) one or more vinyl esters, (meth)acrylic esters, vinylaromatics, olefins, 1,3-dienes, vinyl ethers, and vinyl halides, and optionally further monomers copolymerizable therewith, the polymerization taking place in the presence of
(B) at least one silicone resin which is functionalized with ethylenically unsaturated, radically polymerizable groups and contains siloxane units of the formula $$[R^1_p(OR^2)_z SiO_{(4-p-z)/2}] \qquad (I),$$

where $R^1$ is identical or different at each occurrence and is a radical R* or E, where
R* is identical or different at each occurrence and is a hydrogen atom or is a substituted or unsubstituted hydrocarbon radical which contains no aliphatic multiple C—C bond(s), has 1 to 18 carbon atoms, and
E is an ethylenically unsaturated radical of the formula —(CH$_2$)$_3$—X,
where
X is an ethylenically unsaturated organic group,
and $R^1$ is an ethylenically unsaturated radical E in at least 1 mol % and at most 50 mol % of all siloxane units (I),
$R^2$ is identical or different at each occurrence and is a hydrogen atom or a hydrocarbon radical having 1 to 18 carbon atoms,
p is 0, 1, 2 or 3, and
z is 0, 1, 2 or 3,
where the sum p+z has a value of 0, 1, 2 or 3,
with the proviso that for at least 20 mol % of all siloxane units of the formula (I) in the silicone resin (B), the sum p+z is 1 or 0, with p being 1 or 0 and z being 0,
where for at least 40 mol % of all siloxane units of the formula (I), p=1 and z=0 (T units) and,
if D units R$_2$SiO$_{2/2}$ where R is $R^1$ or OR$^2$ are present, the molar ratio of T/D units is greater than 1:1,
and with the proviso that the radicals R* include at least one carbon-rich hydrocarbon radical having 6 to 18 carbon atoms and at least one carbon-poor radical having 1 to 3 carbon atoms,
the miniemulsion polymerization being carried out by preparing a solution of at least one silicone resin (B) in one or more ethylenically unsaturated monomers (A) in a first step, to provide a silicone resin-in-monomer solution,
emulsifying the resulting silicone resin-in-monomer solution prepared in the first step, using emulsifiers, optionally hydrophobic coemulsifiers, and optionally polymerization inhibitors which prevent premature radical emulsion polymerization, in water in a second step to provide a miniemulsion having a particle size D(50) of not more than 350 nm, and
subjecting the resulting miniemulsion prepared in the second step to radical emulsion polymerization in a third step, where the miniemulsion polymerization is carried out using water-soluble or oil-soluble, or a mixture of water-soluble and oil-soluble, polymerization initiators.

2. The composition of claim 1, wherein the miniemulsion prepared in the second step has particle size D(50) of not more than 250 nm.

3. The composition of claim 1, wherein the miniemulsion prepared in the second step has particle size D(50) of not more than 200 nm.

4. The aqueous composition of claim 1, wherein X is an acrylic or methacrylic radical.

5. The aqueous dispersion of claim 1, wherein the carbon-rich hydrocarbon radicals R* having 6 to 18 carbon atoms comprise at least one of an isooctyl radical or phenyl radical, and the carbon-poor radicals R* having 1 to 3 carbon atoms comprise methyl radicals.

6. The aqueous composition of claim 1, wherein the ethylenically unsaturated monomers include one or more monomers selected from the group consisting of vinyl acetate, vinyl esters of α-branched monocarboxylic acids having 9 to 11 carbon atoms, vinyl chloride, ethylene, methacrylic acid, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, 1,3-butadiene, and mixtures thereof.

7. A method for producing the aqueous dispersion comprising copolymers of ethylenically unsaturated monomers and of ethylenically functionalized silicone resins of claim 1, comprising polymerizing, by radically initiated miniemulsion polymerization in aqueous medium, reactants comprising:
(A) one or more vinyl esters, (meth)acrylic esters, vinylaromatics, olefins, 1,3-dienes, vinyl ethers, and vinyl halides, and optionally further monomers copolymerizable therewith,
in the presence of
(B) at least one silicone resin which is functionalized with ethylenically unsaturated, radically polymerizable groups, comprising siloxane units of the formula $$[R^1_p(OR^2)_z SiO_{(4-p-z)/2}] \qquad (I),$$

where $R^1$ is identical or different at each occurrence and is a radical R* or E, where
R* is identical or different at each occurrence and is a hydrogen atom or is a substituted or unsubstituted hydrocarbon radical which contains no aliphatic multiple C—C bond(s), and has 1 to 18 carbon atoms, and
E is an ethylenically unsaturated radical of the formula —(CH$_2$)$_3$—X,
where
X is an ethylenically unsaturated organic group,
and $R^1$ is an ethylenically unsaturated radical E in at least 1 mol % and at most 50 mol % of all siloxane units (I),
$R^2$ is identical or different at each occurrence and is a hydrogen atom or a hydrocarbon radical having 1 to 18 carbon atoms,
p is 0, 1, 2 or 3, and
z is 0, 1, 2 or 3,
where the sum p+z has a value of 0, 1, 2 or 3,
with the proviso that for at least 20 mol % of all siloxane units of the formula (I) in the silicone resin (B), the sum p+z is 1 or 0, with p being 1 or 0 and z being 0,
where for at least 40 mol % of all siloxane units of the formula (I), p=1 and z=0 (T units) and, if D units R$_2$SiO$_{2/2}$ where R is $R^1$ or OR$^2$ are present, the molar ratio of T/D units is greater than 1:1,
and with the proviso that the radicals R* comprise at least one carbon-rich hydrocarbon radical having 6 to 18 carbon atoms and at least one carbon-poor radical having 1 to 3 carbon atoms,
the miniemulsion polymerization being carried out by preparing a solution of at least one silicone resin (B) in one or more ethylenically unsaturated monomers (A) in a first step, to provide a silicone resin-in-monomer solution, emulsifying the resulting silicone resin-in-monomer solution prepared in the first step in water, using emulsifiers, optionally hydrophobic coemulsifiers, and optionally polymerization inhibitors which prevent premature radical emulsion polymerization, in a second step to provide a miniemulsion having a particle size D(50) of not more than 350 nm, and in a third step, subjecting the resulting miniemulsion prepared in the second step to radical emulsion polymerization, where the miniemulsion polymerization is carried out using water-soluble or oil-soluble polymerization initiator, or a mixture of water-soluble and oil-soluble, polymerization initiators.

8. The method of claim 7, wherein X is an acrylic or methacrylic radical.

9. The method of claim 7, wherein the carbon-rich hydrocarbon radical(s) R* having 6 to 18 carbon atoms comprise at least one of an isooctyl radical or phenyl radical, and the carbon-poor radicals R* having 1 to 3 carbon atoms comprise methyl radicals.

10. The method of claim 7, wherein the ethylenically unsaturated monomers include one or more monomers selected from the group consisting of vinyl acetate, vinyl esters of α-branched monocarboxylic acids having 9 to 11 carbon atoms, vinyl chloride, ethylene, methacrylic acid, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, 1,3-butadiene, and mixtures thereof.

11. An aqueous construction coating composition comprising an aqueous composition of claim 1.

12. An aqueous construction coating composition comprising an aqueous composition produced by the method of claim 7.

13. A method of treating a construction material with an aqueous construction coating composition comprising applying an aqueous composition of claim 1.

14. The method of claim 13, wherein the construction material comprises wood.

15. The composition of claim 1, wherein for at least 30 mol % of all siloxane units of the formula (I) in the silicone resin (B), the sum of p+z is 1 or 0, with p being 1 or 0 and z=0.

16. The composition of claim 1, wherein for at least 40 mol % of all siloxane units of the formula (I) in the silicone resin (B), the sum of p+z is 1 or 0, with p being 1 or 0 and z=0.

17. The composition of claim 1, wherein the molar ratio of T/D units is greater than 70:30.

18. The composition of claim 15, wherein the molar ratio of T/D units is greater than 70:30.

19. The composition of claim 1, wherein the silanol content of the silicone resin (B) is not more than 4.14 wt. %.

20. The composition of claim 1, which when dry, has a hydrophilic surface.

* * * * *